(12) United States Patent
Sengoku et al.

(10) Patent No.: US 9,893,342 B2
(45) Date of Patent: Feb. 13, 2018

(54) ELECTRICITY STORAGE MODULE

(71) Applicants: HITACHI AUTOMOTIVE SYSTEMS, LTD., Hitachinaka-shi, Ibaraki (JP); NISSAN MOTOR CO., LTD., Yokohama-shi, Kanagawa (JP)

(72) Inventors: Eisuke Sengoku, Hitachinaka (JP); Hiroshi Hoshi, Hitachinaka (JP); Takeshi Haga, Hitachinaka (JP); Shigeyuki Kiyota, Kanagawa (JP); Yoshiyuki Tanaka, Kanagawa (JP); Toyoki Iguchi, Kanagawa (JP); Hiroaki Saitou, Kanagawa (JP); Masayoshi Saeki, Kanagawa (JP)

(73) Assignees: HITACHI AUTOMOTIVE SYSTEMS, LTD., Ibaraki (JP); NISSAN MOTOR CO., LTD., Kanagawa (JP)

( * ) Notice: Subject to any disclaimer, the term of this patent is extended or adjusted under 35 U.S.C. 154(b) by 88 days.

(21) Appl. No.: 14/909,751

(22) PCT Filed: Jul. 17, 2014

(86) PCT No.: PCT/JP2014/069097
§ 371 (c)(1),
(2) Date: Feb. 3, 2016

(87) PCT Pub. No.: WO2015/019822
PCT Pub. Date: Feb. 12, 2015

(65) Prior Publication Data
US 2016/0190542 A1 Jun. 30, 2016

(30) Foreign Application Priority Data

Aug. 9, 2013 (JP) .................................. 2013-166802

(51) Int. Cl.
*H01M 2/20* (2006.01)
*H01M 2/10* (2006.01)
(Continued)

(52) U.S. Cl.
CPC ............ *H01M 2/206* (2013.01); *H01G 11/08* (2013.01); *H01G 11/10* (2013.01); *H01G 11/76* (2013.01);
(Continued)

(58) Field of Classification Search
CPC .......... H01M 2/20; H01M 2/206; H01M 2/10; H01M 2/1077; H01M 10/48; H01M 10/482

See application file for complete search history.

(56) References Cited

U.S. PATENT DOCUMENTS

2006/0262482 A1  11/2006  Yamamoto et al.
2007/0188132 A1  8/2007  Kim et al.
(Continued)

FOREIGN PATENT DOCUMENTS

CN    103119753 A    5/2013
EP    2 495 787 A1   9/2012
(Continued)

OTHER PUBLICATIONS

The Extended European Search Report dated Apr. 7, 2017 in the EP Application No. 14833935.1.
(Continued)

*Primary Examiner* — Karie O'Neill Apicella
(74) *Attorney, Agent, or Firm* — Volpe and Koenig, P.C.

(57) ABSTRACT

An electricity storage module in which a plurality of battery cells are electrically connected via conductive members, wherein: each of the conductive members has a pair of electrode connecting parts that are welded to respective electrode terminals of a pair of adjacent battery cells, a base
(Continued)

part that is connected to the pair of electrode connecting parts via a pair of elastically deformable parts, and a voltage detecting terminal that is connected to the base part and detects a terminal voltage of a battery cell.

3 Claims, 17 Drawing Sheets

(51) Int. Cl.
　　　*H01M 10/48*　　　(2006.01)
　　　*H01G 11/08*　　　(2013.01)
　　　*H01G 11/10*　　　(2013.01)
　　　*H01G 11/76*　　　(2013.01)
(52) U.S. Cl.
　　　CPC ....... *H01M 2/1077* (2013.01); *H01M 10/482* (2013.01); *H01M 2220/20* (2013.01); *Y02E 60/13* (2013.01); *Y02T 10/7022* (2013.01)

(56) References Cited

U.S. PATENT DOCUMENTS

| | | |
|---|---|---|
| 2010/0134940 A1 | 6/2010 | Nguyen et al. |
| 2011/0244282 A1* | 10/2011 | Seto .................. H01M 2/1077 429/82 |
| 2012/0064383 A1 | 3/2012 | Tonomura et al. |
| 2012/0212232 A1* | 8/2012 | Ikeda .................. H01M 2/1077 324/426 |
| 2013/0236769 A1 | 9/2013 | Bang et al. |

FOREIGN PATENT DOCUMENTS

| | | |
|---|---|---|
| JP | 2006-324060 A | 11/2006 |
| JP | 2009-289428 A | 12/2009 |
| JP | 2011-216400 A | 10/2011 |
| JP | 2012-138306 A | 7/2012 |
| RU | 2 359 365 C1 | 6/2009 |
| WO | 2008/050952 A1 | 5/2008 |

OTHER PUBLICATIONS

Chinese Office Action dated Apr. 20, 2017 in the Chinese Application No. 201480044135.6.

Russian Office Action dated Apr. 13, 2017 in the Russian Application No. 2016103956.

* cited by examiner

FIG.11
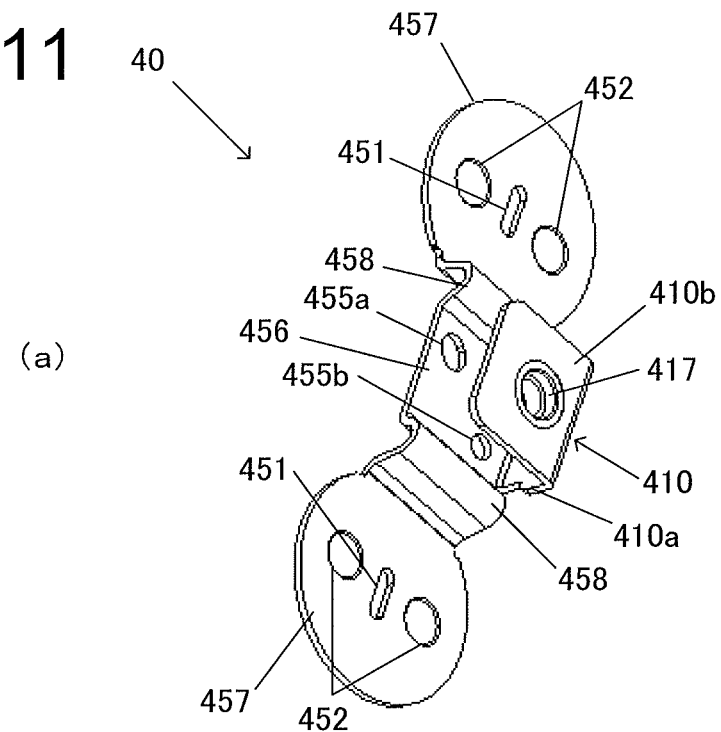
(a)
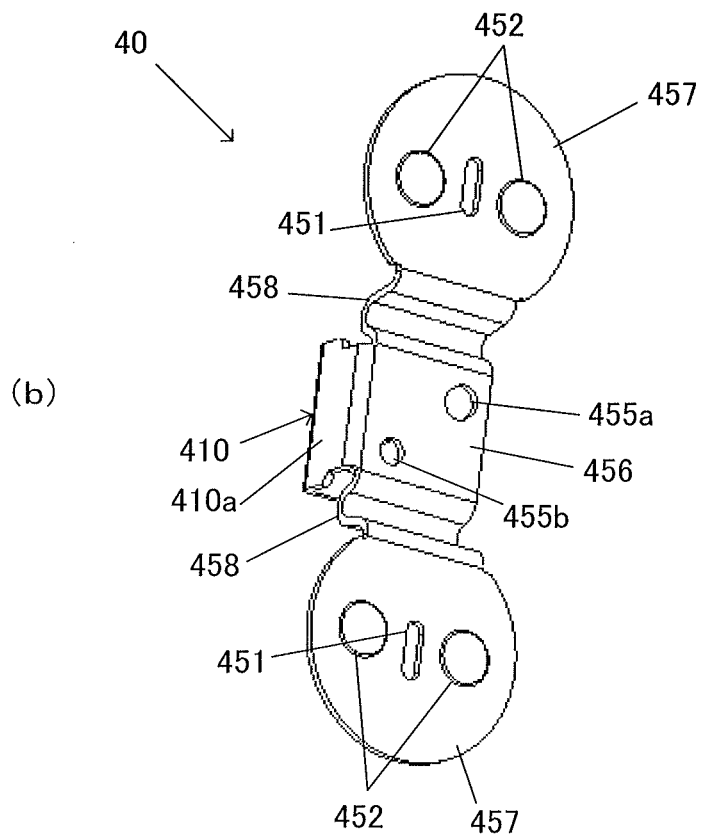
(b)

FIG.17
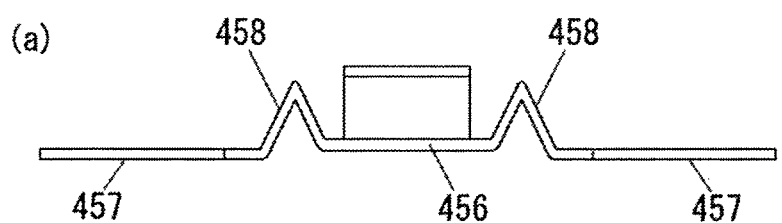
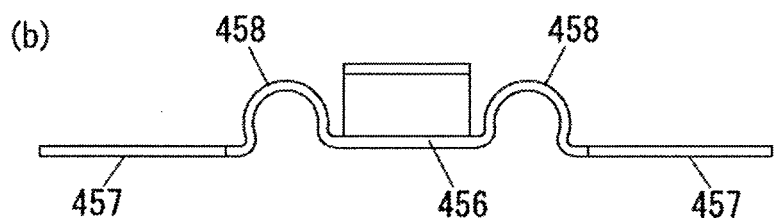

ELECTRICITY STORAGE MODULE

TECHNICAL FIELD

The present invention relates to an electricity storage module.

BACKGROUND ART

Conventionally, an electricity storage module is known that has a housing accommodating a plurality of battery cells such as lithium ion batteries and supports the battery cells by sandwiching them from both sides by means of a pair of side plates that constitute the housing (PTL 1). Through holes are provided in the side plates correspondingly to respective ones of the plurality of battery cells and each through hole is closed by an electrode terminal surface of the battery cell. The battery cell is, in both ends thereof, engaged into through holes of the pair of the side plates so that the position of the battery cell is constrained. An electrically conductive member is welded on the electrode terminal surface of the battery cell which is positioned by the side plates.

The material of the side plates that constrains the position of the battery cell is polybutylene terephthalate (PBT), while the material of the electrically conductive member that electrically connects the battery cells is copper. That is, the materials for both components are different from each other. The coefficient of linear expansion of PBT is in the order of $6.0 \times 10^{-5}$ [1/K], while the coefficient of linear expansion of copper is in the order of $1.7 \times 10^{-5}$ [1/K]. Therefore, if the temperature of the electricity storage module increases and the side plate is thermally expanded, the distance between the battery cells increases. Although the electrically conductive member also thermally expands with an increase in temperature of the electricity storage module, a difference in thermal expansion occurs since the coefficient of linear expansion of copper is smaller than the coefficient of linear expansion of PBT. As a result, the stress due to thermal change is generated at a welding part between the electrically conductive member and the electrode terminal of the battery cell.

In the electricity storage module according to PTL1, the side plates that constrain the position of the battery cell are coupled to an inlet flow path forming plate, an outlet flow path forming plate, an inlet side guiding plate, and an outlet side guiding plate made of rigid metal plates, by means of fastening means such as screws. If the above-described flow path forming plates and guiding plates are made of aluminum diecast or the like having a coefficient of linear expansion of the order of $2.1 \times 10^{-5}$ [1/K], for example, deformation due to thermal change in the side plates is suppressed by the above-described flow path forming plates or guiding plates.

CITATION LIST

Patent Literature

PTL1: Japanese Laid-Open Patent Publication No. 2011-216400

SUMMARY OF INVENTION

Technical Problem

In the electricity storage module according to PTL1, the inlet flow path forming plate, the outlet flow path forming plate, the inlet side guiding plate, and the outlet side guiding plate that constitute the housing are formed of metal plates, which results in an increase in weight and cost. Measures have been thus required for effectively relaxing stress in a welding point generated due to thermal change, while reducing weight and cost.

Solution to Problem

An electricity storage module, according to a first aspect of the present invention, in which a plurality of battery cells are electrically connected via conductive members, wherein: each of the conductive members has a pair of electrode connecting parts that are welded to respective electrode terminals of a pair of adjacent battery cells, a base part that is connected to the pair of electrode connecting parts via a pair of elastically deformable parts, and a voltage detecting terminal that is connected to the base part and detects a terminal voltage of a battery cell.

Advantageous Effects of Invention

According to the present invention, stress generated at the welding part between the electrode terminal of the battery cell and the electrically conductive member can be relaxed.

BRIEF DESCRIPTION OF DRAWINGS

FIG. 11 Outer perspective views of the bus bar.

FIG. 17 Views showing a bus bar used for the electricity storage module according to variations of the present invention.

DESCRIPTION OF EMBODIMENT

Figure 1:
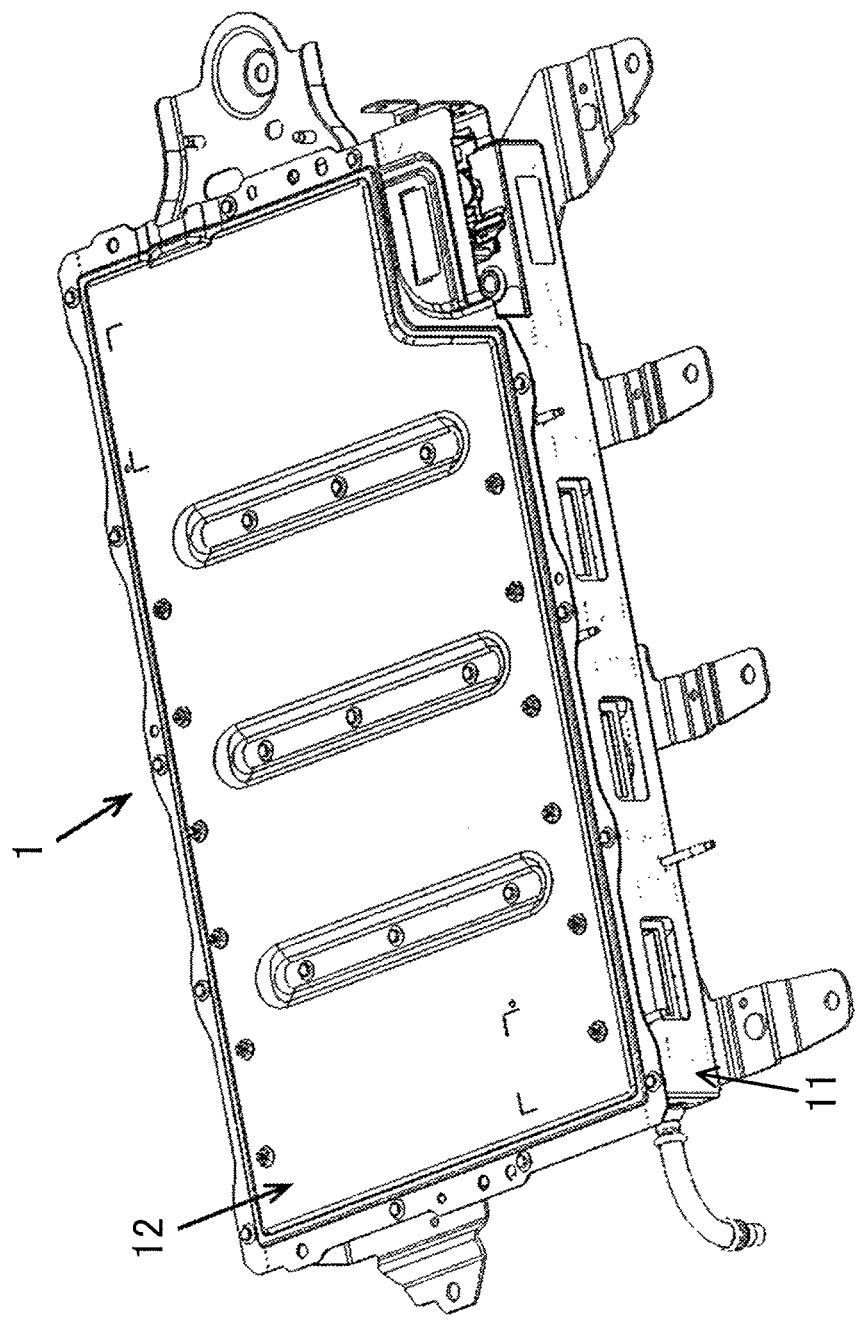
FIG. 1 An outer perspective view of a battery device according to an embodiment of the present invention.

In the following, an embodiment will be described referring to the drawings, in which the present invention is applied to an electricity storage module (battery module) integrated in a battery device mounted on a hybrid electric vehicle which is driven by both an engine and a motor or a purely electric vehicle which is driven by only a motor.

Figure 2:
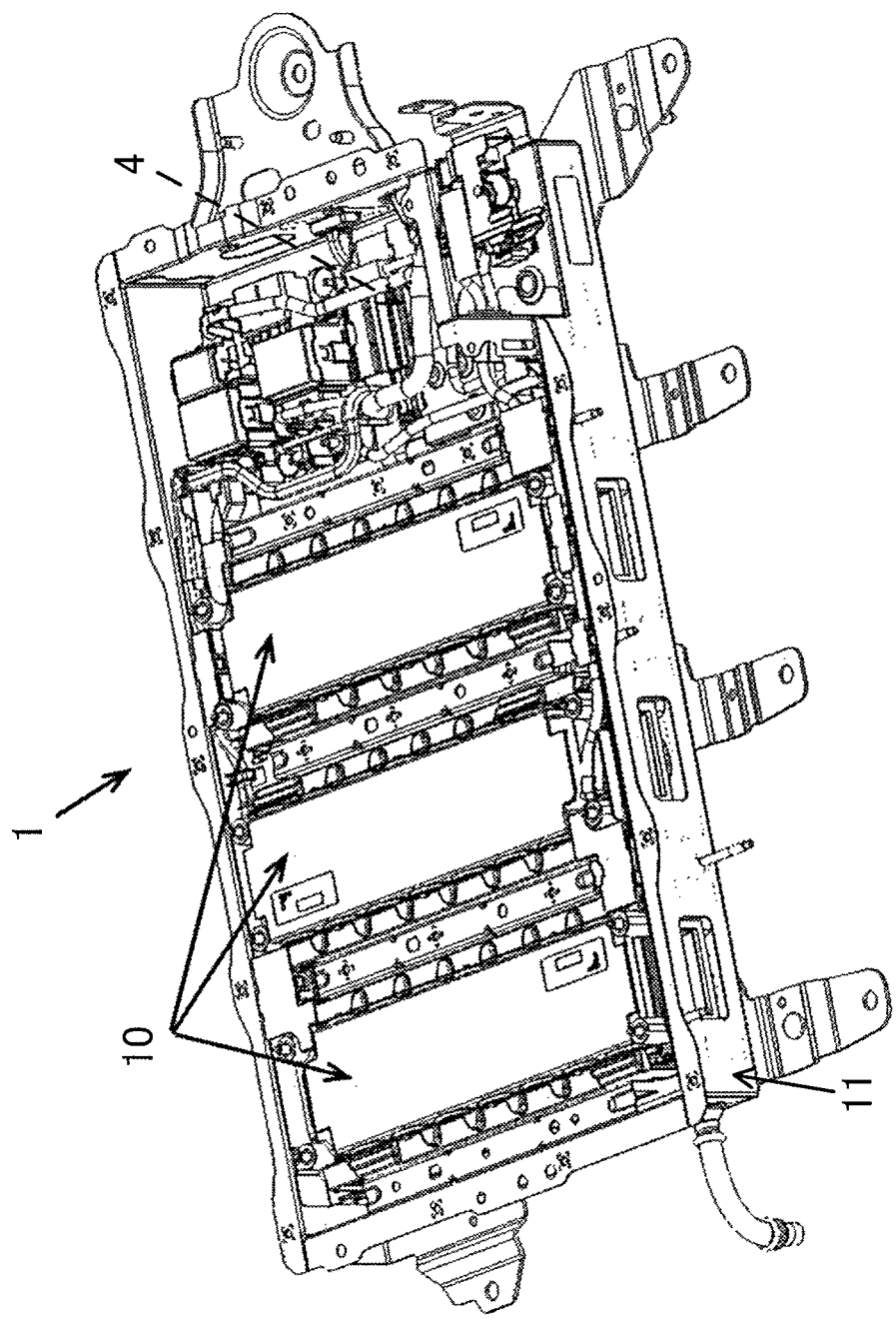
FIG. 2 An outer perspective view of the battery device, with a top cover being removed.

Referring to FIG. 1 and FIG. 2, an overall configuration of the battery device 1 will be described. FIG. 1 is an outer perspective view of the battery device 1 according to an embodiment of the present invention and FIG. 2 is an outer perspective view of the battery device 1, with a top cover being removed.

The battery device 1 has an electricity storage module 10 and a control unit 4 that are contained in a module housing thereof. The module housing is a generally rectangular parallelepiped housing having a housing space therein and comprising a lower case 11 and the top cover 12. The lower case 11 has a shallow rectangular box-like shape that is open on its top side. The top cover 12 is a planar plate and is attached to the lower case 11 so as to close the top opening of the lower case 11.

The top cover 12 and the lower case 11 are formed by thin metal plates machined by pressing or the like. In the module housing, three electricity storage modules 10 are arranged in a row so that their longitudinal direction are parallel to each other. Three electricity storage modules 10 are electrically connected.

Figure 3:
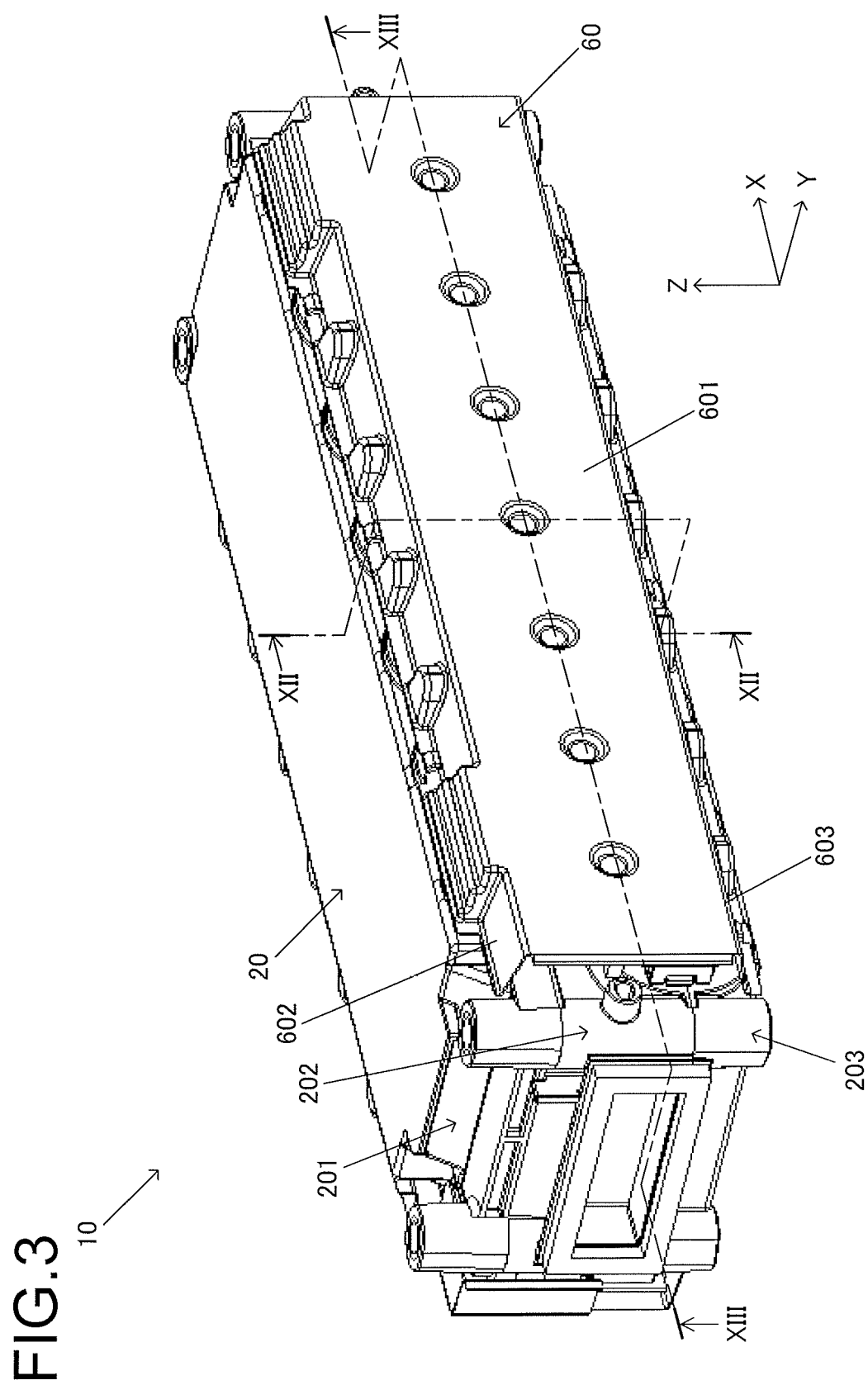
FIG. 3 An outer perspective view of an electricity storage module according to an embodiment of the present invention.
Figure 4:
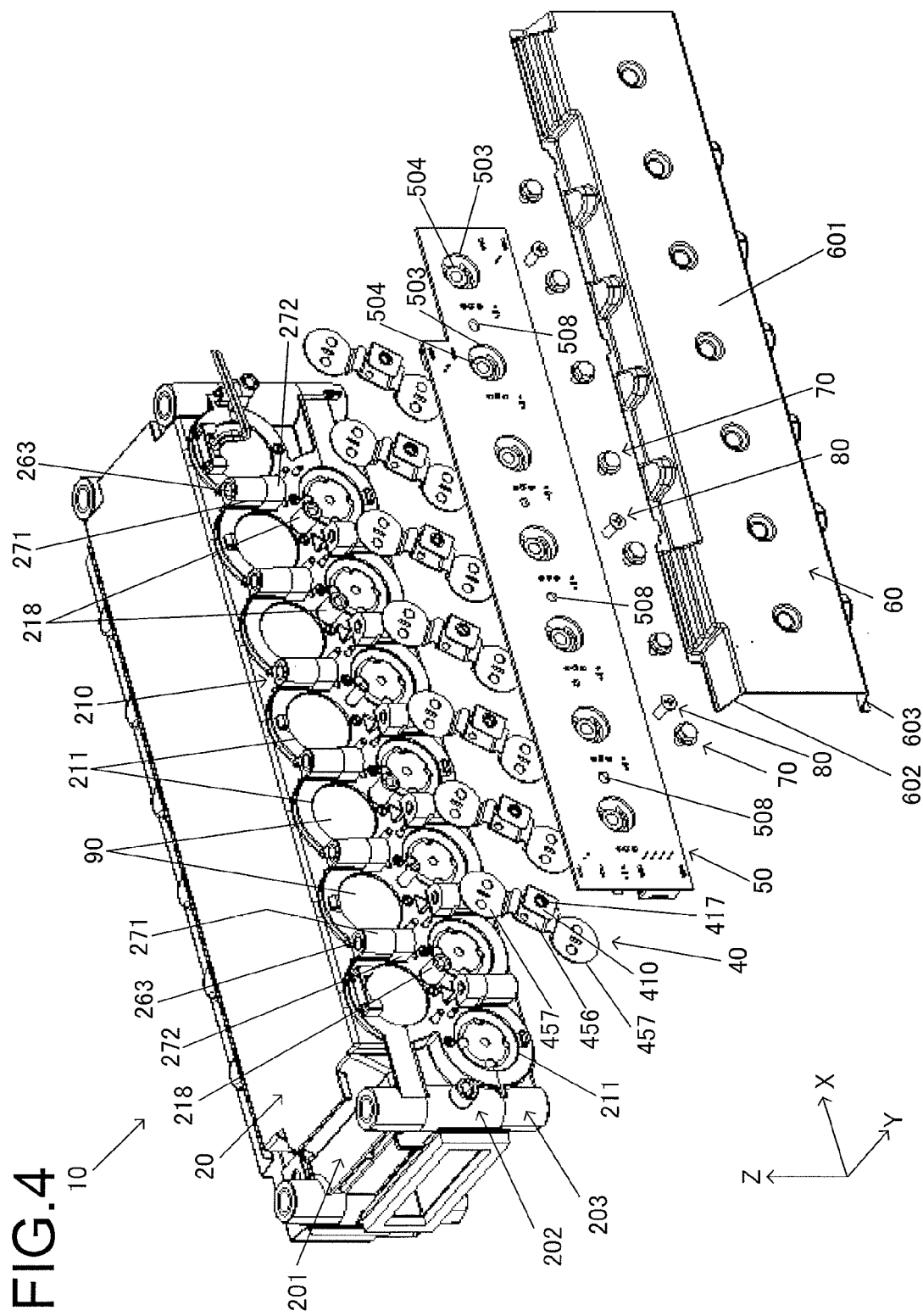
FIG. 4 An exploded perspective view of the electricity storage module in FIG. 3.

FIG. 3 is an outer perspective view of the electricity storage module 10 according to an embodiment of the present invention. FIG. 4 is an exploded perspective view of the electricity storage module 10. Since the electricity storage modules 10 have an identical configuration, only one electricity storage module 10 will be representatively described. The electricity storage module 10 has a generally rectangular parallelepiped shape as shown in FIG. 3 and the electricity storage module 10 is constructed of a plurality of battery cells 90 that are electrically connected via bus bars 40, as shown in FIG. 4. The electricity storage module 10 is configured to include the plurality of battery cells 90, the plurality of bus bars 40, a holding case 20 that holds the plurality of battery cells 90, a voltage detecting substrate 50, and a cover 60. Each of the plurality of battery cells 90 has a cylindrical shape and they are arranged so that their central axes CA are parallel to each other (see FIG. 8).

It should be noted that in the following description, a direction in which the electricity storage module 10 has the longest extension, i.e. the longitudinal direction of the electricity storage module 10 is defined as X direction. A direction of the central axis of the battery cell 90 is defined as Y direction. A direction in which the electricity storage module 10 has the shortest extension, i.e. the transverse direction of the electricity storage module 10 is defined as Z direction. X, Y, and Z directions are orthogonal to one another.

Figure 5:
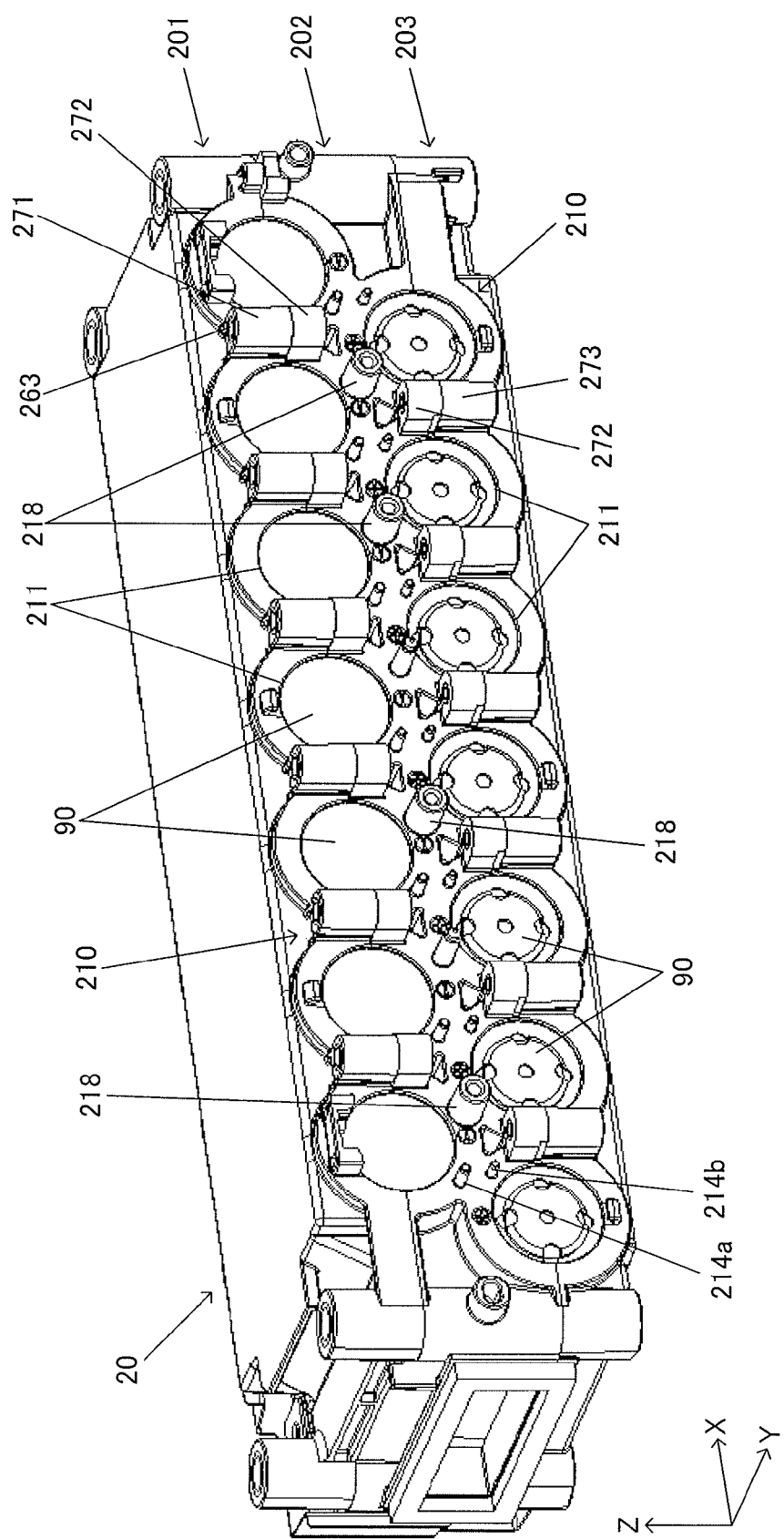
FIG. 5 An outer perspective view showing the electricity storage module, with a voltage detecting substrate, a cover, and a plurality of bus bars arranged on one side being removed.

FIG. 4 shows an exploded view of the voltage detecting substrate 50, the cover 60, the bus bars 40, and other parts on one side in the Y direction. The configuration of the voltage detecting substrate, the cover, the bus bars, and other parts on the other side in the Y direction are still coupled. FIG. 5 is an outer perspective view showing the electricity storage module 10, with the voltage detecting substrate 50, the cover 60, and the plurality of bus bars 40 arranged on one side being removed. The voltage detecting substrate 50, the cover 60, the bus bars 40, and other parts on one side of the electricity storage module 10 shown in FIG. 4 have the same configuration as that of the voltage detecting substrate, the cover, the bus bars, and other parts on the other side not illustrated.

As shown in FIG. 4 and FIG. 5, the battery cells 90 assembled into the electricity storage module 10 are lithium ion batteries having a nominal voltage of 3.6 Volt. In the battery cell 90, components such as a group of rolled electrodes are accommodated in a cylindrical battery container having an electrolyte filled therein. One end surface in the central axis direction of the battery cell 90 serves as a positive terminal surface, while the other end surface serves a negative terminal surface. On each of positive electrode and negative electrode sides of the battery cell 90, a safety valve is provided. The safety valve is broken if the pressure in the battery container reaches a predetermined pressure due to malfunction such as over-charging, so that gas generated in the battery container is discharged out of the battery container in order to reduce the pressure in the battery container.

The holding case 20 is configured to hold the battery cells 90 arranged in a stacked manner. The holding case 20 constrains positions of the plurality of the battery cells 90 in such a manner they are arranged in parallel to each other.

In the electricity storage module 10, seven battery cells 90 are arranged at the same interval in the upper layer (on the top side in the figure) and in the lower layer (on the bottom side in the figure). The battery cells 90 in the upper layer and the battery cells 90 in the lower layer are held with an offset to each other by one half pitch in the X direction. As a result, the battery cells 90 in the lower layer and the battery cells 90 in the upper layer can be closely arranged, so that extension of the electricity storage module 10 in the Z direction can be reduced.

The battery cell 90 in the upper layer and the battery cell 90 in the lower layer are arranged so that orientations of the positive terminal and negative terminal of both battery cells 90 are inverted with respect to each other. One end in the Y direction of the battery cell 90 in the upper layer constitutes the negative terminal and the other end constitutes the positive terminal (not shown in FIG. 4). One end in the Y direction of the battery cell 90 in the lower layer constitutes the positive terminal and the other end constitutes the negative terminal (not shown in FIG. 4).

The holding case 20 has three members: a lower holding member 203, a middle holding member 202, and an upper holding member 201 that are made of a resin having an insulation property such as polybutylene terephthalate (hereinafter, referred to as PBT). The lower battery cells 90 are sandwiched and held between the lower holding member 203 and the middle holding member 202, and the upper battery cells 90 are sandwiched and held between the middle holding member 202 and the upper holding member 201.

Figure 6:
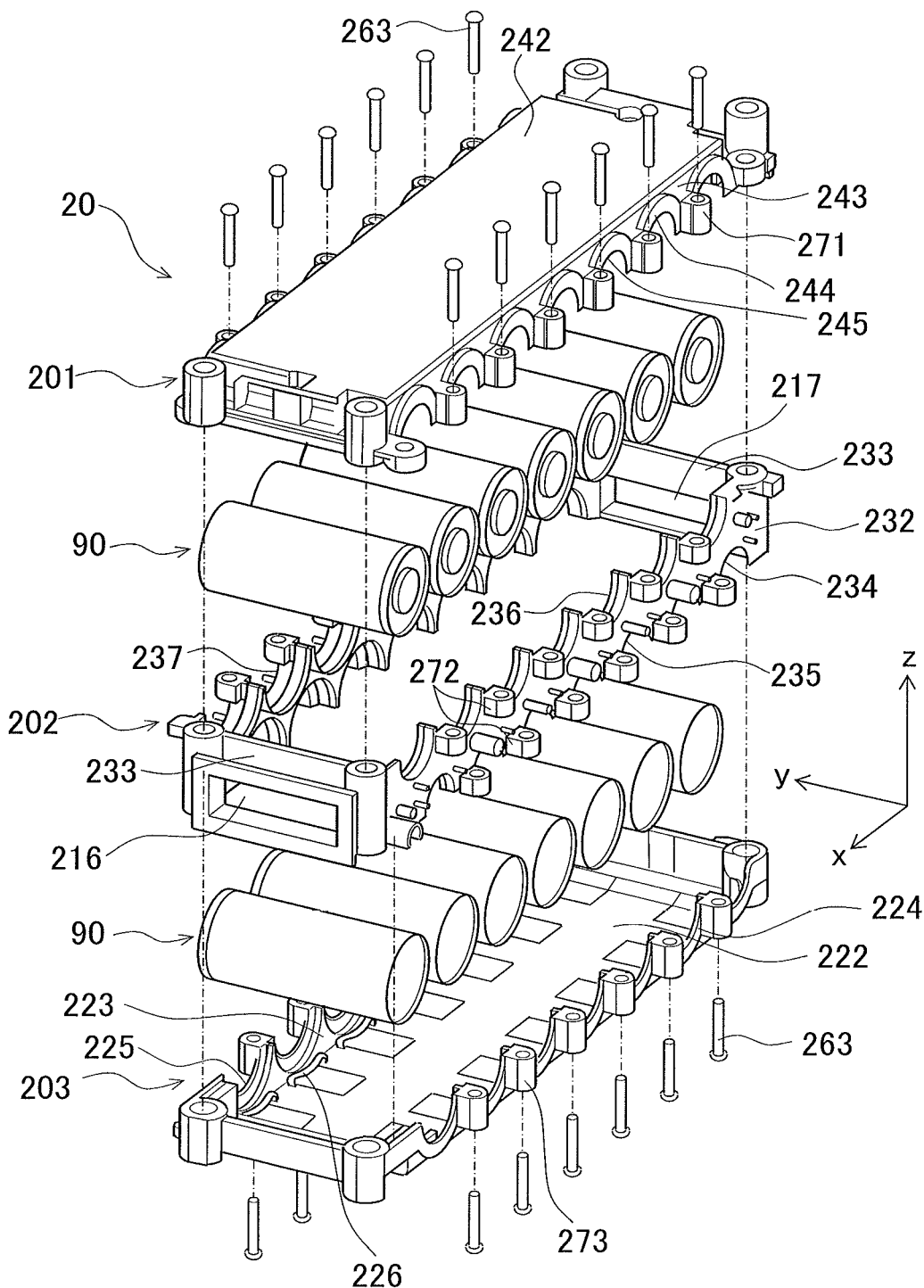
FIG. 6 An exploded perspective view of a holding case.
Figure 7:
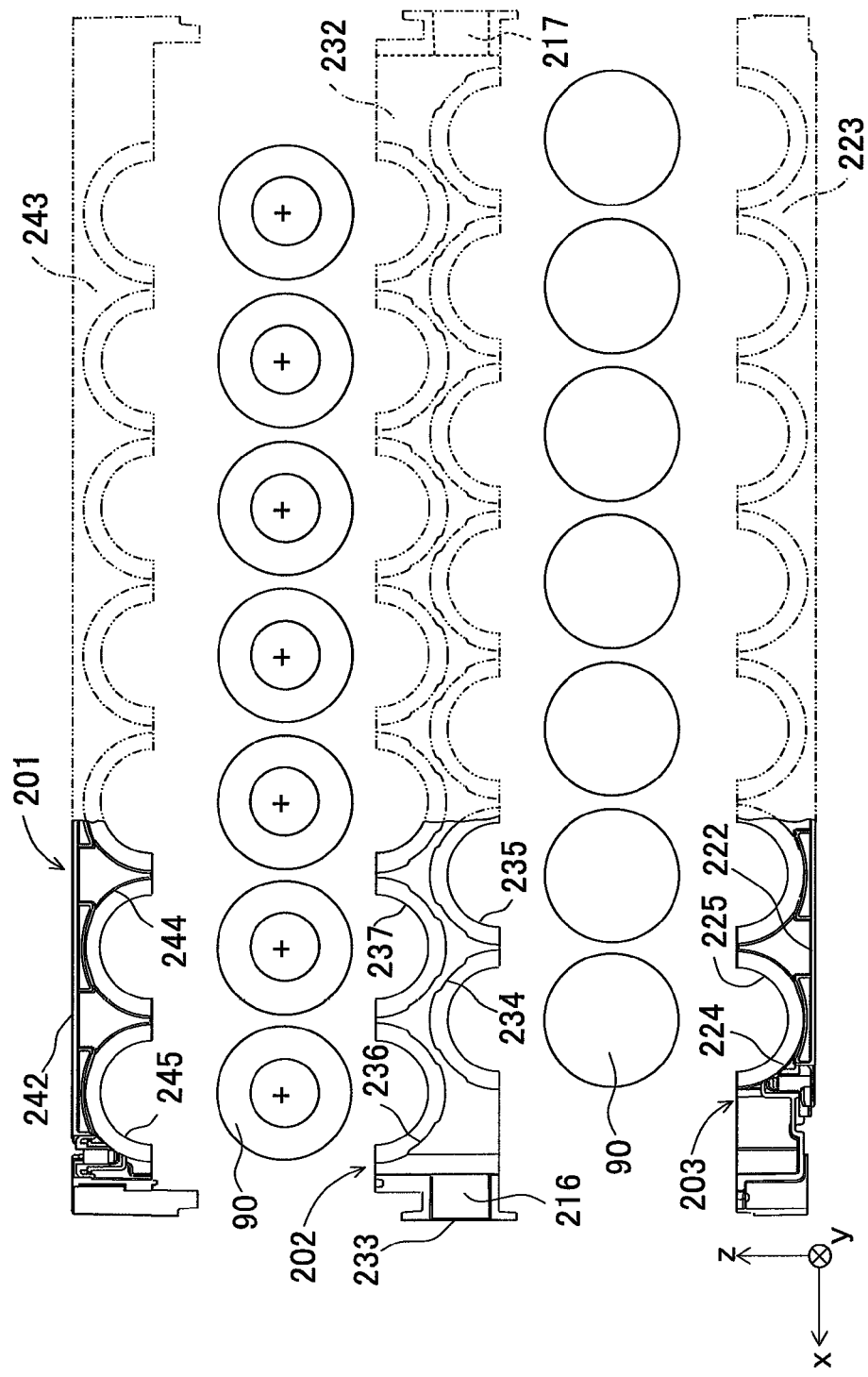
FIG. 7 An exploded cross-sectional view of the holding case.

Referring to FIG. 6 to FIG. 9, a holding structure of the holding case 20 for the battery cells 90 will be described. FIG. 6 is an exploded perspective view of the holding case 20 and FIG. 7 is an exploded cross-sectional view of the holding case 20. It should be noted that FIG. 6 is an exploded perspective view of the electricity storage module 10 in FIG. 5 seen from the opposite side.

As shown in FIG. 6 and FIG. 7, the lower holding member 203 has a planar lower surface part 222 that extends in the X direction with a constant lateral width (a length in the Y direction) and a pair of lower vertical wall surface parts 223 that stand upright from both side ends in the transverse direction (Y direction) of the lower surface part 222 and oppose to each other. The lower surface part 222 of the lower holding member 203 constitutes a lower surface part of the holding case 20 and the lower vertical wall surface parts 223 constitute lower parts of side plates 210 of the holding case 20.

The pair of lower vertical wall surface parts 223 is provided with lower layer lower holding parts 224, each of which holds the lower part of each battery cell 90 in the lower layer, and opening window parts 225, each of which exposes center parts of both end surfaces in the center axis direction of the battery cell 90 which is held in the lower layer lower holding part 224.

Each lower layer lower holding part 224 has a lower layer lower recessed surface that is cut out in a half circular form from the upper edge of the lower vertical wall surface part 223 towards the lower surface part 222 so as to contact the outer circumference surface of the end of the battery cell 90, and opposing surfaces that oppose to the end surfaces in the center axis direction of the battery cell 90.

The middle holding member 202 has a pair of middle vertical wall surface parts 232 that extend in the X direction with a constant length in the Y direction and oppose to each other, and end surface parts 233 that connect a pair of middle vertical wall surface parts 232 to each other on both ends in the longitudinal direction (X direction) of the middle vertical wall surface parts 232. When the middle holding member 202 is overlapped on the lower holding member 203 and coupled thereto, each middle vertical wall surface part 232 is continuously connected to the top of each lower vertical wall surface part 223 of the lower holding member 203. The middle vertical wall surface part 232 of the middle holding member 202 constitutes the center part in the Z direction of the side plate 210 of the holding case 20, and each end surface part 233 of the middle holding member 202 constitutes each end surface part of the holding case 20. An opening part 216 as an inlet for cooling wind is formed in one of the pair of end surface parts 233, and an opening part 217 as an outlet for cooling wind is formed on the other.

The pair of the middle vertical wall surface parts 232 is provided with lower layer upper holding parts 234, each of which holds the upper part of each battery cell 90 which is held in the lower holding member 203, and upper layer lower holding parts 236, each of which holds the lower part of each battery cell 90 in the upper layer. The middle vertical wall surface parts 232 is provided with opening window parts 235 and 237, which expose center parts on both end surfaces in the center axis direction of the battery cell 90 which is held in the lower layer upper holding part 234, and center parts of both end surfaces in the center axis direction of the battery cell 90 which is held in the upper layer lower holding part 236, respectively.

Each lower layer upper holding part 234 has a lower layer upper recessed surface that is cut out in a half circular form from the lower edge of the middle vertical wall surface part 232 towards the upper edge so as to contact the outer circumference surface of the end of the battery cell 90, and opposing surfaces that oppose to the end surfaces in the center axis direction of the battery cell 90.

Each upper layer lower holding part 236 has an upper layer lower recessed surface that is cut out in a half circular form from the upper edge of the middle vertical wall surface part 232 towards the lower edge so as to contact the outer circumference surface of the end of the battery cell 90, and opposing surfaces that oppose to the end surfaces in the center axis direction of the battery cell 90.

Each lower layer upper holding part 234 and each upper layer lower holding part 236 are positioned with an offset to each other by a half pitch in the longitudinal direction of the middle holding member 202. In other words, the center of the upper layer lower holding part 236 is located between adjacent lower layer upper holding parts 234, and the center of the lower layer upper holding part 234 is located between adjacent upper layer lower holding parts 236.

The upper holding member 201 has a planar upper surface part 242 that extends in the X direction with a constant lateral width (length in the Y direction) and a pair of upper vertical wall surface parts 243 that are suspended from both side ends in the transverse direction (Y direction) of the upper surface part 242 and oppose to each other. The upper surface part 242 of the upper holding member 201 constitutes the upper surface part of the holding case 20, while the upper vertical wall surface part 243 constitutes the top of the side plate 210 of the holding case 20.

The pair of the upper vertical wall surface parts 243 is provided with upper layer upper holding parts 244, each of which holds the upper part of each battery cell 90 in the upper layer, and opening window parts 245, each of which exposes the center parts of both end surfaces in the center axis direction of the battery cell 90 which is held in the upper layer upper holding part 244.

Each upper layer upper holding part 244 has an upper layer upper recessed surface that is cut out in a half circular form from the lower edge of the upper vertical wall surface part 243 towards the upper surface part 242 so as to contact the outer circumference surface of the end of the battery cell 90, and opposing surfaces that oppose to the end surfaces in the center axis direction of the battery cell 90.

Each of the upper holding member 201, the middle holding member 202, and the lower holding member 203 is provided with a plurality of boss parts 271, 272, 273, through which fastening screws 263 are inserted. The upper holding member 201 and the middle holding member 202 are coupled by screwing the fastening screws 263 into threaded holes of the boss parts 271, 272 of the upper holding member 201 and the middle holding member 202. The middle holding member 202 and the lower holding member 203 are coupled by screwing the fastening screws 263 into the boss parts 272, 273 of the middle holding member 202 and the lower holding member 203.

The lower layer upper holding part 234 of the middle holding member 202 and the lower layer lower holding part 224 of the lower holding member 203 cooperates to hold the battery cell 90 in the lower layer in such a manner that movement of the battery cell 90 in the center axis direction and the radial direction is restricted. The upper layer lower holding part 236 of the middle holding member 202 and the upper layer upper holding part 244 of the upper holding member 203 cooperates to hold the battery cell 90 in the upper layer in such a manner that movement of the battery cell 90 in the center axis direction and the radial direction is restricted.

Figure 8:
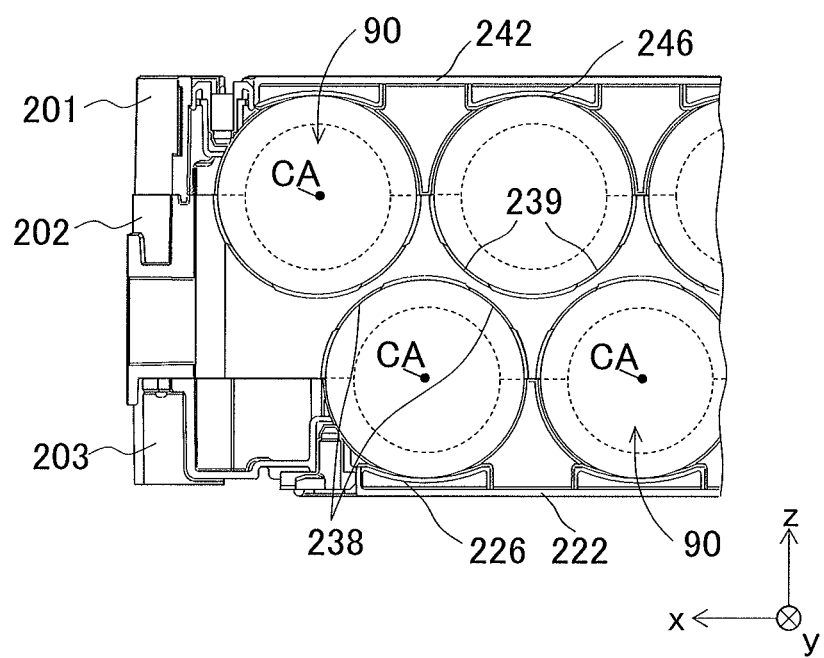
FIG. 8 A view showing a holding structure of the holding case.
Figure 9:
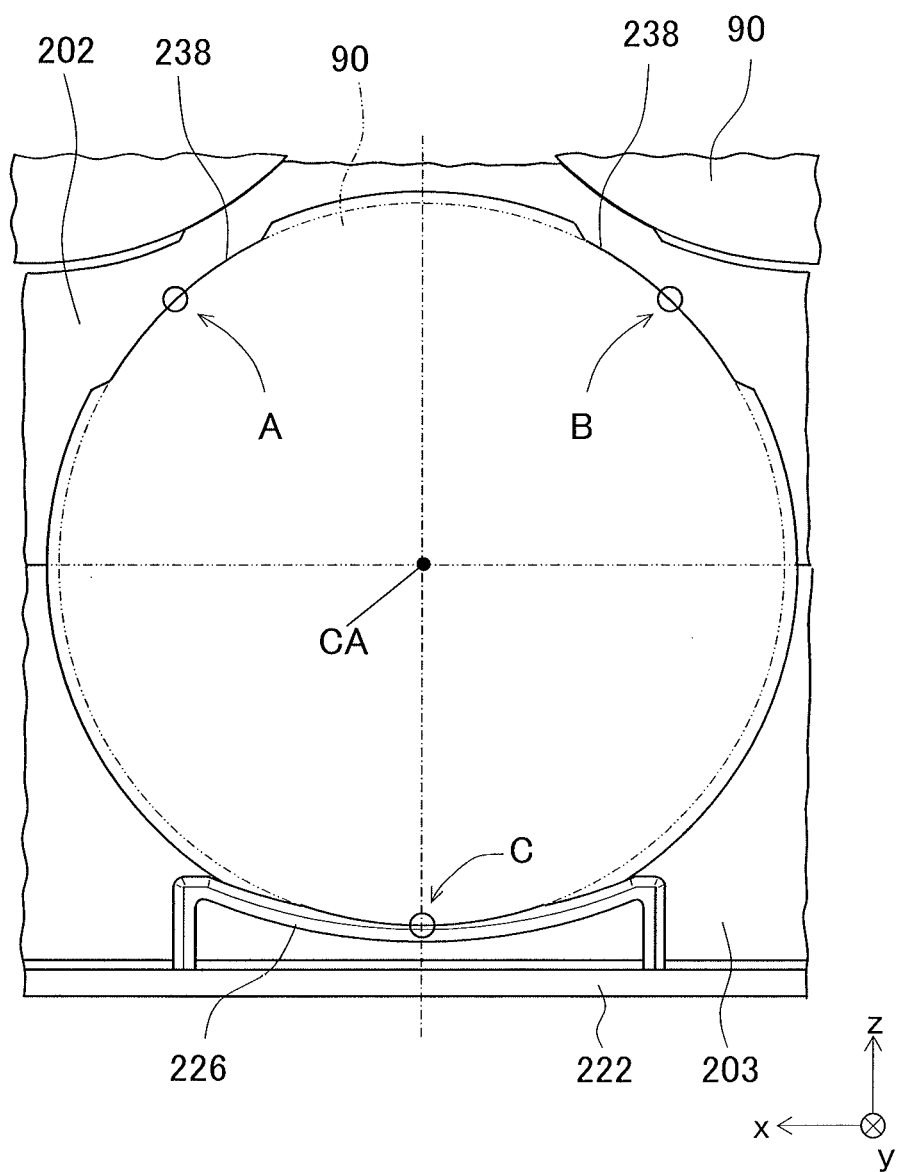
FIG. 9 A partial enlarged view of FIG. 8.

FIG. 8 is a view showing a holding structure of the holding case 20. FIG. 9 is a partial enlarged view of FIG. 8, showing the holding structure for the battery cells 90 in the lower layer. As shown in FIG. 8 and FIG. 9, lower layer lower recessed surfaces are formed in the lower holding member 203, each of which surfaces has a half circular shape having a slightly larger radius than that of the outer circumference surface of the battery cell 90. Generally M-shaped elastically deformable pressing parts 226 are integrally formed on the lower surface part 222 along the lower layer lower recessed surface.

Lower layer upper recessed surfaces is formed in the middle holding member 202, each of which surfaces has a half circular shape having a slightly larger radius than that of the outer circumference surface of the battery cell 90. Two protruding parts 238 are formed on the lower layer upper recessed surface. The pressing part 226 is formed on the YZ plane including the center axis CA of the battery cell 90 and two protruding parts 238 are formed to be plane-symmetrical with respect to the YZ plane including the central axis CA. When the lower layer lower recessed surface of the lower holding member 203 and the lower layer upper recessed surface of the middle holding member 202 are mated together, a recessed surface having a circular shape is formed. The end in the axial direction of the battery cell 90 is surrounded by this circular recessed surface from the outside in radial direction.

As shown in FIG. 8, upper layer upper recessed surface in the upper holding member 201 is formed, each of which surfaces has a half circular shape having a slightly larger radius than that of the outer circumference surface of the battery cell 90. Generally M-shaped elastically deformable pressing parts 246 are integrally formed on the upper surface part 242 along the upper layer upper recessed surface.

Upper layer lower recessed surfaces are formed in the middle holding member 202, each of which surfaces has a half circular shape having a slightly larger radius than that of the outer circumference surface of the battery cell 90. Two protruding parts 239 are formed on the upper layer lower recessed surface. The pressing part 246 is formed on the YZ plane including the center axis CA of the battery cell 90 and two protruding parts 239 are formed to be plane-symmetrical with respect to the YZ plane including the central axis CA. When the upper layer lower recessed surface of the middle holding member 202 and the upper layer upper recessed surface of the upper holding member 202 are mated together, a recessed surface having a circular shape is formed. The end in the axial direction of the battery cell 90 is surrounded by this circular recessed surface from the outside in the radial direction.

Herein, in the battery cell 90 in the lower layer, a contact point between one protruding part 238 and the outer circumference of the battery cell 90 is represented by reference sign A, a contact point of the other protruding part 238 and the outer circumference of the battery cell 90 is represented by reference sign B, and a contact point of the pressing part 226 and the outer circumference of the battery cell 90 is represented by reference sign C, as shown in FIG. 9. The point C is set on the YZ plane including the central axis CA, and points A and B are preferably set at positions in plane-symmetrical to the YZ plane including the central axis CA.

With this configuration, the battery cell 90 in the lower layer contacts two protruding parts 238 of the middle holding member 202 in such a manner that it is upwardly pressed by the pressing part 226 of the lower holding member 203. As a result, the battery cell 90 in the lower layer is held at three points in three directions in a balanced manner and the position of the battery cell 90 is constrained by the pressing part 226 and the protruding parts 238.

It should be noted that the battery cell 90 in the upper layer is held in the same manner. As shown in FIG. 8, the battery cell 90 in the upper layer contacts two protruding parts 239 of the middle holding member 202 in such a manner that it is downwardly pressed by the pressing part 246 of the upper holding member 201. As a result, the battery cell 90 in the upper layer is held at three points in three directions in a balanced manner and the position of the battery cell 90 is constrained by the pressing part 246 and the protruding parts 239.

Since the position of each battery cell 90 is constrained by the holding case 20, an tolerance of the diameter of the outer circumferences of the arranged battery cell 90 can be accommodated by deformation in the upper and lower pressing parts 226, 246, even if the diameter of the outer circumference deviates slightly.

Figure 10:
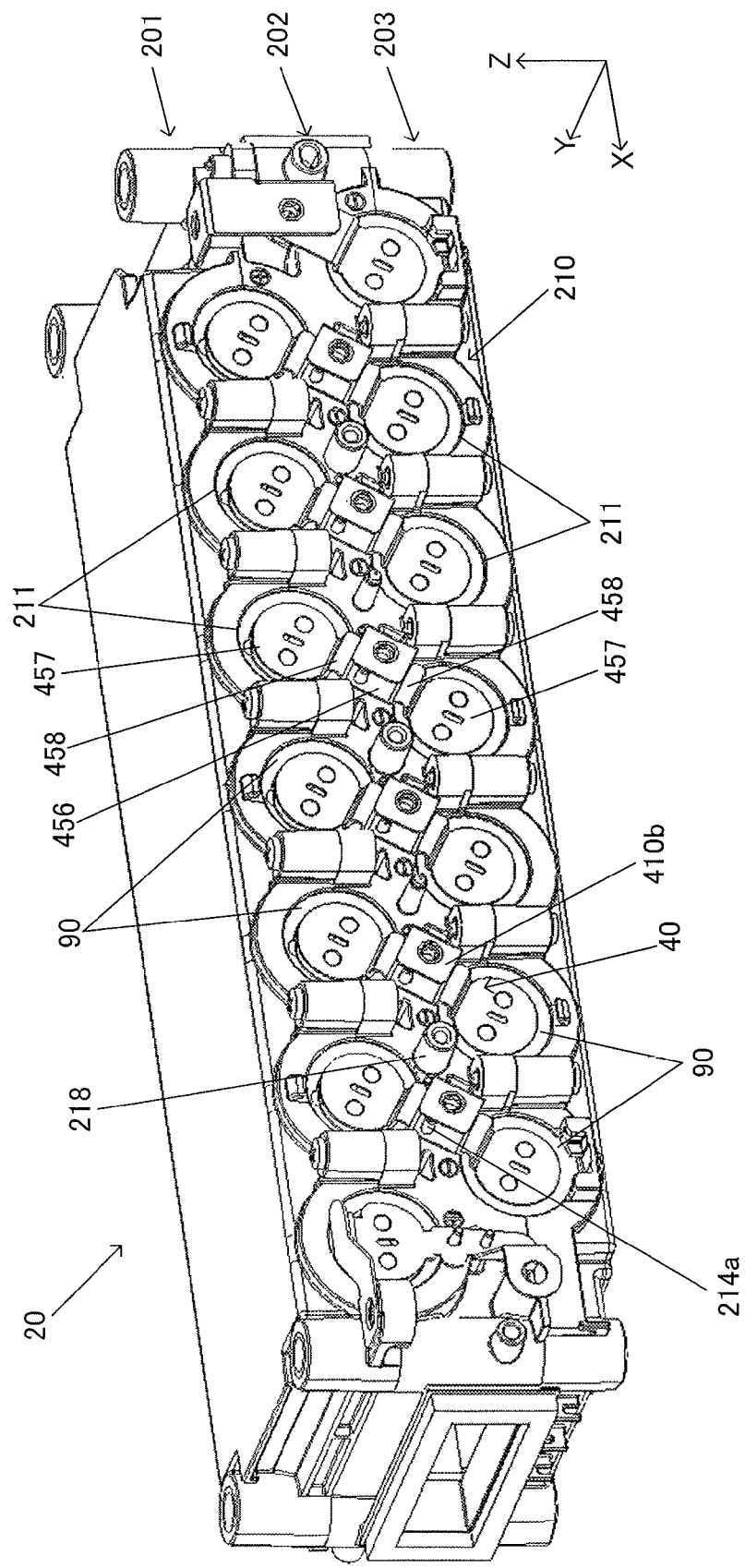
FIG. 10 An outer perspective view showing the electricity storage module, with the voltage detecting substrate and the cover arranged on the other side being removed.

When the lower holding member 203, the middle holding member 202, and the upper holding member 201 are coupled, circular opening windows 211 that expose respective end surfaces on both sides in the Y direction of the battery cell 90 are formed on respective side plates 210 on both sides in the Y direction of the holding case 20 (only one side plate 210 in the Y direction is shown in FIG. 4 and FIG. 5, and only the other side plate 210 in the Y direction is shown in FIG. 10). The opening window 211 that exposes the electrode terminal surface of the battery cell 90 in the upper layer is formed by the opening window part 245 of the upper holding member 201 and the opening window part 237 of the middle holding member 202. The opening window 211 that exposes the electrode terminal surface of the battery cell 90 in the lower layer is formed by the opening window part 225 of the lower holding member 203 and the opening window part 235 of the middle holding member 202.

The bus bars 40 are welded on the electrode terminal surfaces of the battery cells 90 which are exposed through the opening window 211, i.e. the positive terminal surface and the negative terminal surface, so that adjacent battery cells 90 in the upper layer and in the lower layer are electrically connected.

FIG. 10 is an outer perspective view showing the electricity storage module 10, with the voltage detecting substrate 50 and the cover 60 arranged on the other side being removed. This figure is a perspective view of the electricity storage module 10 in FIG. 5 seen from the opposite side. As shown in FIG. 10, the bus bars 40 are copper plate-like electrically conductive members (conductive members) that electrically connect adjacent battery cells 90 in the upper layer and in the lower layer.

FIG. 11(a) is an outer perspective view of the bus bar 40 and FIG. 11(b) is an outer perspective view of the bus bar 40 seen from the opposite side. FIG. 15(c) and FIG. 15(d) are views for illustrating shapes of the bus bar 40. FIG. 15(c) is a perspective view schematically showing the bus bar according to this embodiment and FIG. 15(d) is a side view seen from a direction D in FIG. 15(c). In FIG. 15(c) and FIG. 15(d), illustration of elongate holes 451, joint parts 452, through holes 455a, 455b, and female threaded part 417 is omitted.

As shown in FIG. 11, FIG. 15(c), and FIG. 15(d), the bus bar 40 has a base part 456, a pair of electrode connecting parts 457, a pair of bending parts 458, and a voltage detecting terminal 410. The bus bar 40 is formed by a planar material being cut, bent or the like by pressing. The base part 456 has a rectangular planar shape. A generally disk-like electrode connecting part 457 is connected on one end side of the base part 456 via the bending part 458, and another generally disk-like electrode connecting part 457 is connected on the other end side of the base part 456 via another bending part 458. One electrode connecting part 457 is welded on the positive terminal surface (or the negative terminal surface) of the battery cell 90 in the upper layer, while the other electrode connecting part 457 is welded on the negative terminal surface (or the positive terminal surface) of the battery cell 90 in the lower layer.

Figure 12:
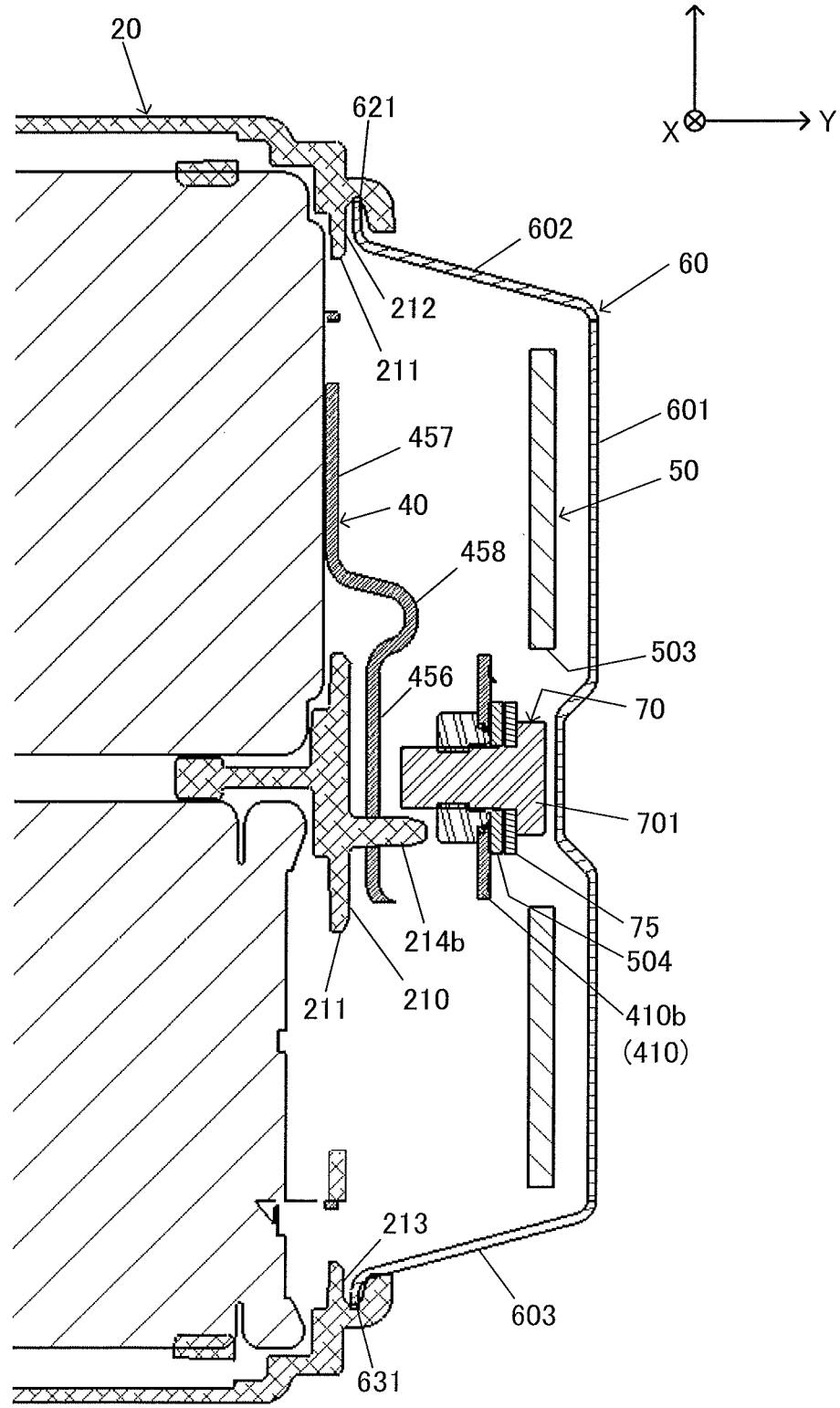
FIG. 12 A schematic cross-sectional view cut by a plane along a line XII-XII in FIG. 3.
Figure 13:
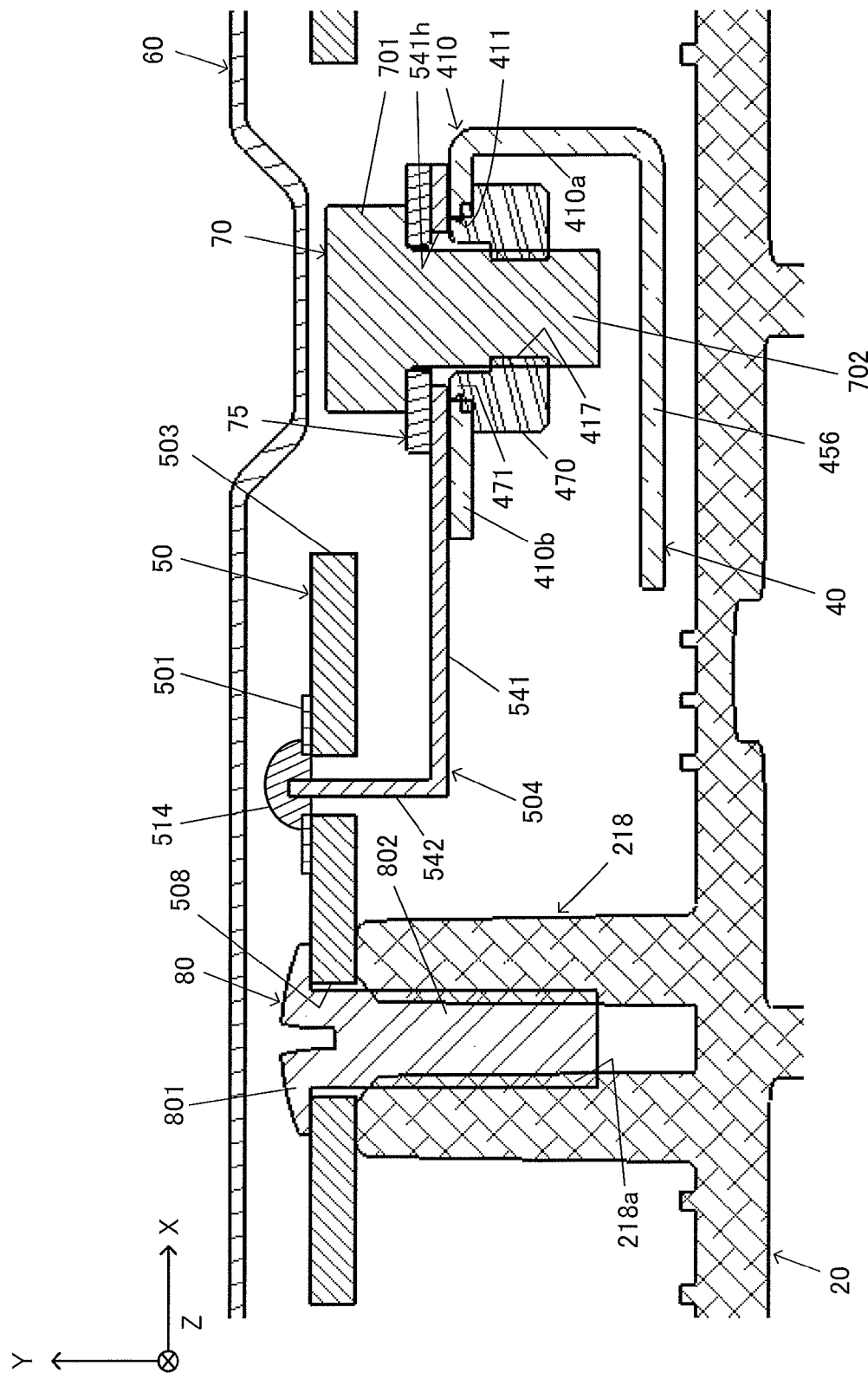
FIG. 13 A schematic cross-sectional view cut by a plane along a line XIII-XIII in FIG. 3.

Both the base part 456 and the electrode connecting parts 457 of the bus bar 40 are arranged in parallel to the XZ plane (see FIG. 12 and FIG. 13). As shown in FIG. 15(d), contact surfaces of a pair of electrode connecting parts 457 onto the electrode terminals of the battery cells 90 are located on the same plane T.

A voltage detecting terminal 410 having a L-shaped cross section is integrally formed on the base part 456. The voltage detecting terminal 410 is bent by 90 degrees from one side of the base part 456 towards the cover 60 side (+Y direction in FIG. 13) and has a rising part 410a that rises up from the base part 456 and a terminal part 410b that is arranged oppositely to the base part 456.

The bending part 458 connecting the base part 456 and each electrode connecting part 457 extends along one side of the base part 456 and projects from the base part 456 towards a terminal part 410. The bending part 458 has an inner planar plate part that is bent by 90 degrees from the base part 456 towards the terminal part 410b, a curve part that is bent by 180 degrees from a tip part of the inner planar plate part, and an outer planar plate part that extends from an end of the curve part to the electrode connecting part 457. The cross sectional shape of the bending part 458 is thus a U-shape. The bending part 458 is elastically deformed when a pair of electrode connecting parts 457 move away from each other or when they move closer to each other, as described hereinafter. Furthermore, the bending part 458 is elastically deformed when the base part 456 moves closer to the battery cell 90 (in −Y direction in FIG. 13), as described hereinafter.

In FIG. 15(c) and FIG. 15(d), the center axis CA of the battery cell 90 which is joined to the electrode connecting part 457 is shown. A pair of bending parts 458 has a plane-symmetrical shape with respect to a plane S orthogonal to one plane including respective center axes CA of a pair of battery cells 90, in the center between the central axes CA of the pair of battery cells 90. Thus, as shown in FIG. 15(d), a distance (L1) from the plane S, which is located in the center of a segment connecting a pair of center axes CA, to one of the pair of bending parts 458 is equal to a distance (L2) to the other (L1=L2).

As shown in FIG. 15(d), a height dimension p of the bending part 458 from the base part 456 as a reference point is equal to or lower than a height dimension q of the voltage detecting terminal 410 from the base part 456 as a reference point (p≤q). In other words, the apex of the bending part 458 does not outwardly project beyond the terminal part 410b. It should be noted that the height dimension q of the voltage detecting terminal 410 from the base part 456 as a reference point is set under consideration of a height of a nut 470 and a projecting length of a bolt 70 so that a connecting terminal 504 and the terminal part 410b can be fastened by means of the nut 470 and the bolt 70, as shown in FIG. 13.

As shown in FIGS. 11(a) and (b), one elongate hole 451 is formed in each electrode connecting part 457 of the bus bar 40. Two joint parts 452 for joint with the electrode terminal surface of the battery cell 90 are formed in each electrode connecting part 457 of the bus bar 40. The surface of the joint part 452 on the terminal part 410b side is slightly recessed, while the opposite surface slightly protrudes. The elongate hole 451 functions to regulate electric current flow, when the electrode connecting part 457 of the bus bar 40 and the electrode terminal surface of the battery cell 90 are arc-welded. Through holes 455a, 455b are formed in the base part 456 of the bus bar 40, through which guide pins 214a, 214b (see FIG. 5) provided on the side plate 210 are inserted.

FIG. 12 is a schematic cross-sectional view cut by the YZ plane along a line XII-XII in FIG. 3, in which only the cross-sectional part is schematically shown. The bus bar 40 is mounted on the side plate 210 so that each through hole 455a, 455b of the base part 456 engages with each guide pin 214a, 214b of the side plate 210 (see FIG. 5). When the bus bar 40 is mounted on the side plate 210, both electrode connecting parts 457 of the bus bar 40 (only one electrode connecting part 457 is shown in FIG. 12) enter into the opening window 211 to abut against the electrode terminal surface (the positive terminal surface or the negative terminal) of the battery cell 90. The electrode connecting part 457 of the bus bar 40 and the electrode terminal surface of the battery cell 90 are joined by arc-welding of the joint part 452 and the battery cell 90, with a welding torch (not shown) being positioned at the joint part 452, for example.

FIG. 13 is a schematic cross-sectional view cut by the XY plane along a line XIII-XIII in FIG. 3, in which only the cross-sectional part is schematically shown. As shown in FIG. 13, the nut 470 is fixedly secured to the surface of the terminal part 410b on the base part 456 side. A circular opening part 411 is provided in the center of the terminal part 410b and the base end part 471 of the nut 470 is swaged in the opening part 411. The nut 470 is provided with a through hole that penetrates from an end on the cover 60 side towards the battery cell 90 side. A part having no female thread is formed from the end on the cover 60 side to a predetermined length of the through hole and a female threaded part (effective threaded part) 417 is formed from the end of the part having no female thread to the end on the battery cell 90 side.

As shown in FIG. 4, the voltage detecting substrate 50 is generally rectangular and arranged in parallel to the XZ plane. The voltage detecting substrate 50 has a voltage detecting circuit (not shown) that detects a terminal voltage of each battery cell 90. A connector (not shown) for connecting a voltage detecting line (not shown) or the like is provided on one end of the voltage detecting substrate 50 and the voltage detecting circuit (not shown) of the voltage detecting substrate 50 is connected to a controller (not shown) via the voltage detecting line (not shown). The voltage detecting substrate 50 is mounted on the side plate 210 of the holding case 20 after each bus bar 40 is mounted.

In the center part in the Z direction of the side plate 210, a plurality of bosses 218 are provided and arranged in a row in the X direction. As shown in FIG. 13, the boss 218 is provided so as to project in the Y direction and has a female threaded part 218a, into which a set screw 80 is screwed. The female threaded part 218a (effective threaded part) extends a predetermined length from a tip surface of the boss 218 and is chamfered on the tip surface side. The voltage detecting substrate 50 is fixed to the holding case 20 by screwing the set screw 80 to the female threaded part 218a provided on the boss 218 of the side plate 210 of the holding case 20.

As shown in FIG. 4, FIG. 12, and FIG. 13, circular opening parts 503 are formed in the voltage detecting substrate 50 at positions where they oppose to the respective terminal parts 410b of the bus bars 40 in the state where the voltage detecting substrate 50 is mounted on the side plate 210. A connecting terminal 504 is arranged in each opening part 503, the connecting terminal 504 being electrically connected to the terminal part 410b. As shown in FIG. 12 and FIG. 13, the voltage detecting terminal 410 and the connecting terminal 504 are connected by means of the bolt 70 and the nut 470.

As shown in FIG. 13, the connecting terminal 504 includes a planar plate part 541 that is abutted against the terminal part 410b, and an insert part 542 that is bent by 90 degrees from the end in −X direction of the planar plate part 541 towards +Y direction, i.e. towards the voltage detecting substrate 50. The planar plate part 541 and the insert part 542 form a L-shaped cross section.

Through holes (hereinafter referred to as bolt holes 541h) are provided in the planar plate part 541, through which shafts 702 of the bolts 70 are inserted. The tip part of the insert part 542 is inserted into the through hole of the voltage detecting substrate 50, as schematically shown in FIG. 13, and is joined to a voltage detecting circuit 501 provided in the voltage detecting substrate 50 by means of solder 514.

Through holes (hereinafter referred to as threaded holes 508) are provided in the voltage detecting substrate 50, through which shafts 802 of the set screws 80 are inserted. In the state where the voltage detecting substrate 50 is abutted against the tip surface of the boss 218, a shaft 802 of the set screw 80 is inserted into a threaded hole 508 and a male threaded part provided in the shaft of the set screw 80 is screwed with the female threaded part 218a of the boss 218.

After the set screw 80 is fastened by a predetermined amount, the voltage detecting substrate 50 is sandwiched by a seat surface of a head 801 of the set screw 80 and the tip surface of the boss 218 so that the voltage detecting substrate 50 is fixed to the holding case 20.

When the voltage detecting substrate 50 is fixed by the set screw 80, the planar plate part 541 of the connecting terminal 504 is abutted against the terminal part 410 of the bus bar 40. The shaft 702 of the bolt 70 is inserted into the bolt hole 541h of the connecting terminal 504 and the opening part 411 of the terminal part 410b, so that the male threaded part provided in the shaft 702 of the bolt 70 is screwed with the female threaded part 417 of the nut 470.

A washer 75 is arranged between a seat surface of the head 701 of the bolt 70 and the planar plate part 541 of the connecting terminal 504. When the bolt 70 is fastened by a predetermined amount, the planar plate part 541 of the connecting terminal 504 and the washer 75 are sandwiched by the seat surface of the head 701 of the bolt 70 and the terminal part 410 of the bus bar 40, so that the voltage detecting terminal 410 of the bus bar 40 and the connecting terminal 504 are electrically connected. As a result, the bus bar 40 and the voltage detecting circuit 501 of the voltage detecting substrate 50 are electrically connected via the connecting terminal 504.

As shown in FIG. 3 and FIG. 4, the cover 60 is molded from a resin having an insulation property such as PVC (polyvinyl chloride) and is configured to entirely cover the side plate 210 and the voltage detecting substrate 50. The cover 60 has a generally rectangular side cover part 601, a top cover part 602 that extends from an end in +Z direction of the side cover part 601 towards the holding case 20, and a bottom cover part 603 that extends from an end in −Z direction of the side cover part 601 towards the holding case 20.

As shown in FIG. 12, a mount part 621 that is bent in +Z direction (upwards in the figure) is provided at the tip of the top cover part 602. A mount part 631 that is bent in −Z direction (downwards in the figure) is provided at the tip of the lower cover part 603.

Grooves 212 that are open in −Z direction are provided on the end in +Z direction of the holding case 20. The grooves 212 extend a predetermined length along the X direction and are provided at a plurality of positions in the holding case 20. Similarly, grooves 213 that are open in +Z direction are provided on the end in −Z direction of the holding case 20.

The grooves 213 extend a predetermined length along the X direction and are provided at a plurality of positions in the holding case 20.

The cover 60 is configured to be elastically deformable, so that a distance between the top cover part 602 and the bottom cover part 603 is reduced when the top cover part 602 is pressed in −Z direction (downwards in the figure) and the bottom cover part 603 is pressed in +Z direction (upwards in the figure). The operator can therefore remove each mount part 621, 631 from each groove 212, 213 by applying a pressing force from the exterior of the cover 60 and elastically deforming the cover 60 so that the distance between the mount part 621 and the mount part 631 of the cover 60 is reduced. When attaching the cover 60 to the holding case 20, the operator applies the pressing force from the exterior of the cover 60 to elastically deform the cover 60 so that the mount parts 621, 631 are arranged oppositely to respective grooves 212, 213. Then, The mount parts 621, 631 are engaged into respective grooves 212, 213 by removing the pressing force from the exterior of the cover 60.

FIGS. 14(a), (b) are schematic views showing how the bending part 458 of the bus bar 40 connecting a pair of adjacent battery cells 90 is deformed. FIG. 14(a) shows a state before elastic deformation, and FIG. 14(b) shows a state after elastic deformation. It should be noted that in FIGS. 14(a), (b), deformation amounts are exaggeratedly shown for the sake of simplicity. In FIGS. 14(a), (b), a welding part W of the electrode connecting part 457 and the electrode terminal surface of the battery cell 90 is schematically shown with hatching, and components such as the holding case 20 are omitted in the figures, except for the battery cells 90 and the bus bar 40.

In the present embodiment, the material of the holding case 20 that constrains the position of the battery cell 90 is PBT, while the material of the bus bar 40 electrically connecting the battery cells 90 is copper. That is, the material of both components are different from each other. The coefficient of linear expansion of PBT is in the order of $6.0 \times 10^{-5}$ [1/K], while the coefficient of linear expansion of copper is in the order of $1.7 \times 10^{-5}$ [1/K]. Therefore, if the temperature of the electricity storage module 10 increases and the holding case 20 is thermally expanded, the distance between adjacent battery cells 90 increases. Although the bus bar 40 also thermally expands with an increase in temperature of the electricity storage module 10, a difference in thermal expansion occurs since the coefficient of linear expansion of copper is smaller than the coefficient of linear expansion of PBT.

In the present embodiment, the bending parts 458 that are to be elastically deformed are provided on both ends of the base part 456. Therefore, when a distance N between a pair of adjacent battery cells 90 increases or decreases with an increase or decrease in temperature of the holding case 20, each of a pair of bending parts 458 is deformed as a function of variations in the distance N. As a result, the stress generated at the welding parts W of the electrode connecting parts 457 and the electrode terminal surfaces is relaxed.

Figure 14:
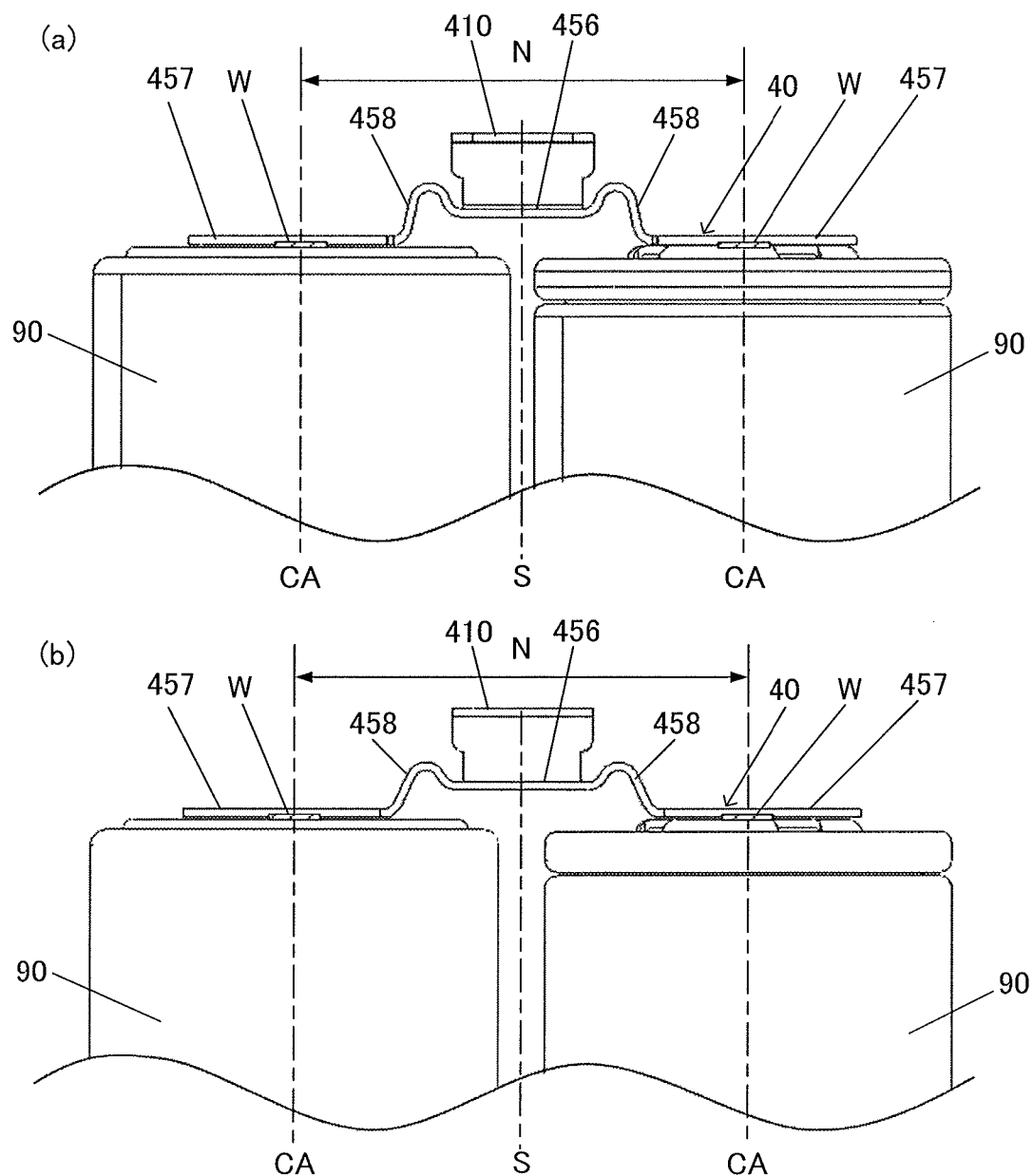
FIG. 14 Schematic views showing how a bending part of the bus bar that connects a pair of adjacent battery cells is deformed.

FIG. 14(a) shows a state where the temperature of the holding case 20 and the bus bar 40 is a room temperature (for example, 20 degrees Celsius). The bending part 458 has been not deformed at the room temperature. When the temperature of the holding case 20 and the bus bars 40 increases to about 60 degrees Celsius, for example, the pair of adjacent battery cells 90 move away from each other so that the distance N increases. As the distance N increases, the bending part 458 is outwardly drawn by the electrode connecting part 457 that is fixedly secured on the electrode terminal surface, so that the U-shaped bending part 458 is deformed in such a manner that the opening side thereof is opened and the bus bar 40 stretches in the longitudinal direction, as shown in FIG. 14(*b*). Consequently, the stress generated at the welding part W between the electrode connecting part 457 and the electrode terminal surface can be relaxed.

Although not shown, when the temperature of the holding case 20 and the bus bars 40 decreases to about −40 degrees Celsius, for example, the pair of adjacent battery cells 90 move closer to each other so that the distance N decreases. As the distance N decreases, the bending part 458 is inwardly pressed by the electrode connecting part 457 that is fixedly secured on the electrode terminal surface, so that the U-shaped bending part 458 is deformed in such a manner that the opening side thereof is closed and the bus bar 40 retracts in the longitudinal direction. Consequently, the stress generated at the welding parts W between the electrode connecting parts 457 and the electrode terminal surfaces can be relaxed.

According to the present embodiment described above, the following advantageous effects can be achieved.

(1) The bus bar 40 has the pair of electrode connecting parts 457 that are welded to respective electrode terminals in the pair of adjacent battery cells 90, the base part 456 that is connected to each of the pair of electrode connecting parts 457 via the pair of bending parts 458, and the voltage detecting terminal 410 that is connected to the base part 456 and detects the terminal voltage of the battery cell 90. Since the bending part 458 is configured to be elastically deformable, the stress generated at the welding part W of the electrode connecting part 457 and the electrode terminal surface of the battery cell 90 due to thermal change can be relaxed when the material of the bus bar 40 and the material of the holding case 20 holding the battery cell 90 are different from each other, i.e. when the coefficient of linear expansion of both components are different from each other.

(2) By providing the pair of bending parts 458, the stress generated at the welding part W due to thermal change is relaxed. Weight and cost can be increased if the whole holding case 20 is closely enclosed by a metal case made of a material having a smaller coefficient of linear expansion than that of PBT, such as aluminum diecast having a coefficient of linear expansion of the order of $2.1 \times 10^{-5}$ [1/K], so that a thermal expansion of the holding case is suppressed in order to the stress generated at the welding part W is relaxed. In contrast, in the present embodiment, there is no need to provide a metal case for suppressing deformation due to thermal change of the holding case 20, so that a reduction in weight and cost can be achieved.

Figure 15:
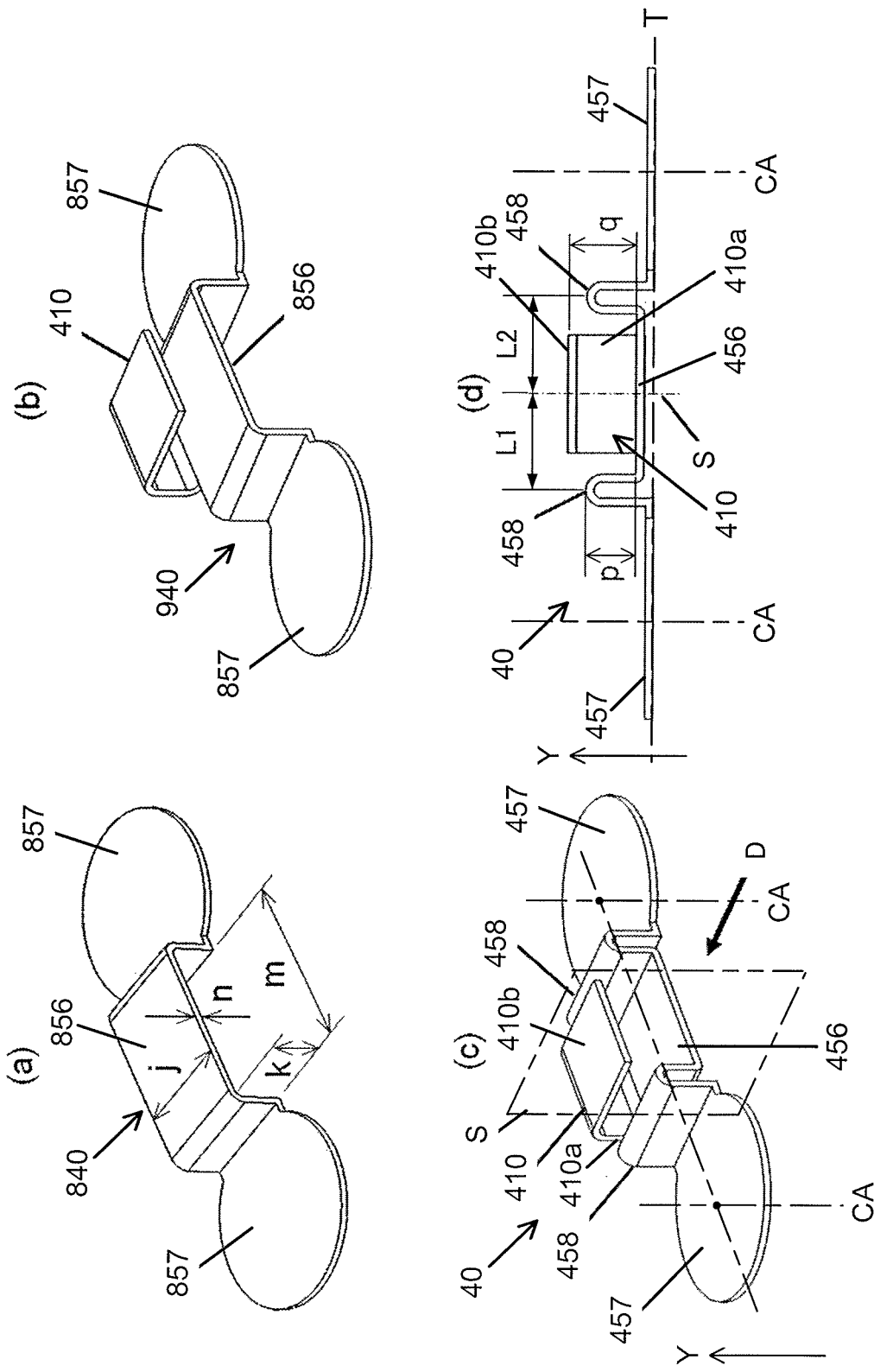
FIG. 15 Schematic views showing bus bars according to a conventional example, a comparative example, and the present embodiment.

(3) As shown in FIG. 15(*d*), the bending part 458 having a U-shaped cross section that projects from the base part 456 towards the terminal part 410*b* of the voltage detecting terminal 410 is formed as an elastic deformable part. The height dimension p of the bending part 458 from the base part 456 as a reference point is equal to or lower than the height dimension q of the voltage detecting terminal 410 from the base part 456 as a reference point. As a result, contact between the connecting terminal 504 that is connected to the terminal part 410*b* of the voltage detecting terminal 410 and the bending part 458 is avoided.

FIG. 15(*a*) is a perspective view showing a bus bar 840 according to a prior art and FIG. 15(*b*) is a perspective view showing a bus bar 940 according to a comparative example. FIG. 15(*c*) and FIG. 15(*d*) are views schematically showing the bus bar 40 according to this embodiment. According to the prior art, the bus bar has a rectangular planar base part 856 and electrode connecting parts 857 located on both ends of the base part 856, wherein the base part 856 and the electrode connecting parts 857 are connected via vertical parts and form steps, as shown in FIG. 15(*a*).

Also in the prior art, since the bus bar 840 is joined to the pair of battery cells 90 by welding, the bus bar 840 is required to have a function of relaxing the stress generated at the welding part due to a change in relative position of the pair of battery cells 90 in the welding part or when the voltage detecting terminal and the connecting terminal are fastened by the bolt. Herein, a width dimension of the base part 856 is represented by j, a height dimension is represented by k, a length dimension is represented by m, a thickness of plate is represented by n. In terms of stress relaxation, it is preferable that the height dimension k and the length dimension m are larger, while the width dimension j and the plate thickness n are smaller. For this reason, the dimensions are set in such a way that the stress is relaxed as large as possible, under consideration of space, weight, strength, electrical performance.

As shown in FIG. 15(*b*), the bus bar 940 according to the comparative example is the conventional bus bar 840 provided with a L-shaped voltage detecting terminal 410. In the comparative example, the height dimension of the bus bar 940 becomes large, which can result in an increase in size of the electricity storage module 10. In the present embodiment, the base part 456 is arranged closely to the electrode connecting part 457 and the bending parts (elastic deforming parts) 458 projecting on the terminal part 410*b* side are provided on both end sides of the base part 456, as shown in FIG. 15(*c*) and FIG. 15(*d*). Thus, the height dimension of the entire bus bar can be reduced. It should be noted that contact of the bending part 458 to the connecting terminal 504 is avoided because the apex of the bending part 458 is set so that it does not protrude beyond the height of the terminal part 410*b*, as described above. Furthermore, in the present embodiment, the elastically deformable bending parts 458 are provided, so that the stress can be more efficiently relaxed in comparison to the prior art and the comparative example shown in FIG. 15(*a*) and FIG. 15(*b*).

(4) The pair of bending parts 458 have a plane-symmetrical shape with respect to a plane S orthogonal to one plane including respective center axis CA of the pair of battery cells 90, so that the lengths L1, L2 from the plane S, which is located in the center between the central axes CA of the pair of battery cells 90, to each of the pair of bending parts 458 are equal to each other. In this way, it is possible to make the stress generated at the welding part between one of the pair of electrode connecting parts and the electrode connecting part 457 equal to the stress generated at the welding part between the other of the pair of electrode connecting parts and the other electrode connecting part 457.

(5) In the configuration of the above-described embodiment, the nut 470 is fixedly secured on the surface of the terminal part 410*b* on the base part 456 side and the connecting terminal 504 and the terminal part 410*b* are fastened by means of the bolt 70 and the nut 470. Accordingly, when the bolt 70 is screwed into the nut 470, the terminal part 410*b* is pressed towards the base part 456 side by the head 701 of the bolt 70. In this point, since the U-shaped bending part 458 deforms, the stress acting on the welding part of the electrode connecting part 457 and the electrode terminal surface can be suppressed.

It should be noted that the following variations are also within the scope of the present invention and one or more of the variations can be combined with the aforementioned embodiment.

[Variations]

(1) Although the case where the material of the bus bar 40 is copper and the material of the holding case 20 is PBT has been described as an example in the above-described embodiment, the present invention is not limited to this, but a variety of materials may be selected for both components. For example, the bus bar 40 may be made of other metal material such as nickel. By applying the present invention to a case where the coefficient of linear expansion of the material of the bus bar 40 and the coefficient of linear expansion of the material of the holding case 20 are different from each other, the stress generated at the welding part between the electrode connecting part 457 and the electrode terminal surface due to thermal change can be relaxed.

Figure 16:
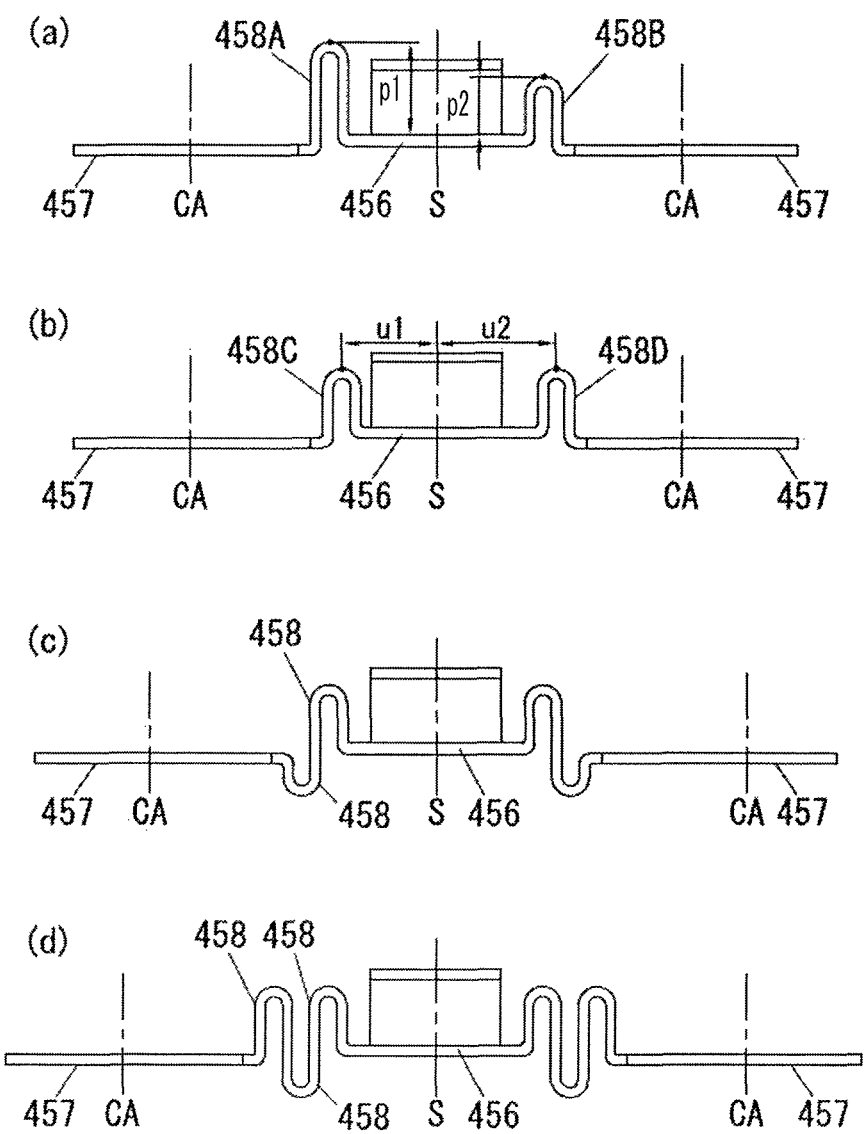
FIG. 16 Views showing a bus bar used for the electricity storage module according to variations of the present invention.

(2) Although the pair of bending parts 458 has a plane-symmetrical shape with respect to the plane S, the present invention is not limited to this. For example, as shown in FIG. 16(a), the height dimension p1 of one of a pair of bending parts 458A, 458B is larger than the height dimension p2 of the other (p1>p2). As shown in FIG. 16(b), one of the pair of bending parts 458C, 458D is located close to the plane S, while the other is located further from the plane S. In other words, distances u1, u2 from the pair of bending parts 458C, 458D, respectively, to the plane S, may be different from each other (u1≠u2).

(3) Although the case where one bending part 458 is provided between the base part 456 and the electrode connecting part 457 has been described in the above-described embodiment, the present invention is not limited to this. As shown in FIG. 16(c) and FIG. 16(d), the number of the bending parts 458 may be two or more.

(4) Although the case where the cross-sectional shape of the bending part 458 is a U-shape has been described in the above-described embodiment, the present invention is not limited to this. For example, as shown in FIG. 17(a) and FIG. 17(b), the cross-sectional shape may be a V-shape or an arc shape. A variety of shapes that can be elastically deformed with a change in the gap between a pair of adjacent battery cells 90 described above may be employed.

(5) Although the case where the nut 470 is fixedly secured on the surface of the terminal part 410b on the base part 456 side has been described in the above-described embodiment, the present invention is not limited to this. Instead of fixedly securing the nut 470, the connecting terminal 504 and the terminal part 410 may be fastened by means of the nut 470 and bolt 70, with the shaft 702 of the bolt 70 being inserted through the opening part 411 of the terminal part 410b and the head 701 of the bolt 70 being fixedly secured on the surface on the base part 456 side of the terminal part 410b.

(6) Although the case where the pressing parts 226 are provided on the lower holding member 203, the pressing parts 246 are provided on the upper holding member 201, and the protruding parts 238, 239 are provided on the middle holding member 202 has been described in the above-described embodiment, the present invention is not limited to this. For example, two protruding parts may be formed in the lower holding member 203, a pressing part may be formed on the lower side of the middle holding member 202, a pressing part may be formed on the upper side of the middle holding member 202, and two protruding parts may be formed on the lower side of the upper holding member 201.

(7) Although the holding case 20 is configured by combining three members: the lower holding member 203, the middle holding member 202, and the upper holding member 201 in the above-described embodiment, the present invention is not limited to this. A variety of constraining members that can constrain the position of each battery cell 90 can be employed.

(8) Although the electricity storage module 10 including the plurality of cylindrical battery cells 90 has been described in the above-described embodiment, the shape of the battery cell 90 is not limited to the cylindrical shape. For example, the present invention may be applied to the electricity storage module including a plurality of prismatic battery cells.

(9) Although the case where the contact surfaces of the pair of electrode connecting parts 457 onto the electrode terminal of the battery cell 90 are located on the same plane T has been described in the above-described embodiment (see FIG. 15(d)), the present invention is not limited to this.

(10) Although the lithium ion battery has been described as an example of battery cells, the present invention may be applied to other secondary batteries such as nickel-hydrogen batteries. Furthermore, the present invention may be applied to electricity storage modules having electric double-layer capacitors or lithium ion capacitors as battery cells.

(11) Although the case where the present invention is applied to an electric vehicle has been described in the above-described embodiment, the present invention is not limited to this. The present invention may be also applied to an electricity storage module integrated in a battery device constituting a vehicle power device for other motor-driven vehicles, for example, railway vehicles such as hybrid trains, omnibus vehicles such as buses, freight vehicles such as trucks, industrial vehicles such as battery-powered fork lift truck.

The present invention is not limited to the above-described embodiment, but variations and modifications may be freely made within the scope without departing from the present invention.

The disclosure of the following priority application is herein incorporated by reference:

Japanese Patent Application No. 2013-166802 (filed Aug. 9, 2013)

REFERENCE SIGNS LIST

1 . . . battery device, 4 . . . control unit, 10 . . . electricity storage module, 11 . . . lower case, 12 . . . upper cover, 20 . . . holding case, 40 . . . bus bar, 50 . . . voltage detecting substrate, 60 . . . cover, 70 . . . bolt, 90 . . . battery cell, 201 . . . upper holding member, 202 . . . middle holding member, 203 . . . lower holding member, 210 . . . side plate, 211 . . . opening window, 212 . . . groove, 213 . . . groove, 214a, 214b . . . guide pin, 216 . . . opening part, 217 . . . opening part, 218 . . . boss, 218a . . . female threaded part, 222 . . . lower surface part, 223 . . . lower vertical wall surface part, 224 . . . lower layer lower holding part, 225 . . . opening window part, 226 . . . pressing part, 232 . . . middle vertical wall surface part, 233 . . . end surface part, 234 . . . lower layer upper holding part, 235 . . . opening window part, 236 . . . upper layer lower holding part, 237 . . . opening window part, 238 . . . protruding part, 239 . . . protruding part, 242 . . . upper surface part, 243 . . . upper vertical wall surface part, 244 . . . upper layer upper holding part, 245 . . . opening window part, 246 . . . pressing part, 271, 272, 273 . . . boss part, 410 . . . voltage detecting terminal, 410a . . . rising part, 410b . . . terminal part, 411 . . . opening part, 417 . . . female threaded part, 451 . . . elongate hole, 452 . . . joint part, 455a, 455b . . . through hole, 456 . . . base part, 457 . . . electrode connecting part, 458 . . . bending part, 470 . . . nut, 471 . . . base end part,

501 . . . voltage detecting circuit, 503 . . . opening part, 504 . . . connecting terminal, 508 . . . threaded hole, 541 . . . planar plate part, 541*h* . . . bolt hole, 542 . . . insert part, 601 . . . side cover part, 602 . . . upper cover part, 603 . . . lower cover part, 621 . . . mount part, 631 . . . mount part, 701 . . . head, 702 . . . shaft, 801 . . . head, 802 . . . shaft, 840 . . . bus bar, 856 . . . base part, 857 . . . electrode connecting part, 940 . . . bus bar

The invention claimed is:

1. An electricity storage module in which a plurality of battery cells are electrically connected via conductive members, wherein:
    each of the conductive members has a pair of electrode connecting parts that are welded to respective electrode terminals of a pair of adjacent battery cells, a base part that is connected to the pair of electrode connecting parts via a pair of elastically deformable parts, and a voltage detecting terminal that is connected to the base part and detects a terminal voltage of a battery cell;
    the voltage detecting terminal has a rising part that rises up from the base part, and a terminal part that is arranged oppositely to the base part; and
each of the elastically deformable part has a bending part that projects from the base part towards the terminal part;
    a height dimension of the bending part from the base part as a reference point is equal to or lower than a height dimension of the voltage detecting terminal from the base part as a reference point;
    the terminal part is provided with an opening part, through which a shaft of a bolt is inserted; and
    a nut or a head of the bolt is fixedly secured on a surface of the terminal part on the base part side.

2. The electricity storage module according to claim 1, wherein:
    each of the pair of battery cells is cylindrically shaped and the pair of battery cells are arranged so that central axes thereof are parallel to each other; and
    the pair of elastically deformable parts are plane-symmetrical with respect to a plane orthogonal to a plane including the central axes of the pair of battery cells so that distances from a center between the central axes of the pair of the battery cells to the pair of the elastically deformable parts are equal to each other.

3. The electricity storage module according to claim 1, comprising:
    a constraining member that constrains positions of the battery cells, wherein:
    a coefficient of linear expansion of the constraining member is different from a coefficient of linear expansion of the conductive members.

* * * * *